(12) United States Patent
Zhang

(10) Patent No.: US 11,318,521 B2
(45) Date of Patent: May 3, 2022

(54) GAS-CHARGING AND FLANGING MACHINE

(71) Applicant: SHENZHEN NEW CANGHAI MACHINERY CO., LTD, Guangdong (CN)

(72) Inventor: Yu Zhang, Guangdong (CN)

(73) Assignee: SHENZHEN NEW CANGHAI MACHINERY CO., LTD, Shenzhen (CN)

( * ) Notice: Subject to any disclaimer, the term of this patent is extended or adjusted under 35 U.S.C. 154(b) by 819 days.

(21) Appl. No.: 16/307,479

(22) PCT Filed: Apr. 4, 2018

(86) PCT No.: PCT/CN2018/081912
§ 371 (c)(1),
(2) Date: Dec. 5, 2018

(87) PCT Pub. No.: WO2019/134283
PCT Pub. Date: Jul. 11, 2019

(65) Prior Publication Data
US 2020/0238364 A1 Jul. 30, 2020

(30) Foreign Application Priority Data
Jan. 5, 2018 (CN) .......................... 201810011278.7

(51) Int. Cl.
*B21D 39/02* (2006.01)
*B21D 19/04* (2006.01)
*F16F 9/32* (2006.01)
*B21D 39/04* (2006.01)
*F16F 9/43* (2006.01)
*F17C 5/06* (2006.01)

(52) U.S. Cl.
CPC .......... *B21D 39/023* (2013.01); *B21D 19/043* (2013.01); *F16F 9/3271* (2013.01); *B21D 19/046* (2013.01); *B21D 39/048* (2013.01); *B23P 2700/14* (2013.01); *F16F 9/43* (2013.01); *F16F 9/432* (2013.01); *F17C 5/06* (2013.01)

(58) Field of Classification Search
CPC . B23P 2700/14; B21D 39/023; B21D 19/043; B21D 19/046; B21D 39/048; B21D 19/06; F16F 9/3271; F16F 9/43; F16F 9/432; F17C 5/06
USPC ............... 141/67, 37; 267/64.28; 188/322.21
See application file for complete search history.

(56) References Cited

U.S. PATENT DOCUMENTS 6,290,033 B1 * 9/2001 Oliver .................... F16D 37/02
188/352
2002/0185193 A1 * 12/2002 Kim ......................... F16F 9/43
141/383

FOREIGN PATENT DOCUMENTS

| EP | 1265023 | A2 | 12/2002 | |
| EP | 1493509 | A1 * | 1/2005 | .......... B21D 19/046 |
| EP | 1493509 | A1 | 1/2005 | |

* cited by examiner

Primary Examiner — Timothy P. Kelly
Assistant Examiner — Christopher M Afful

(57) ABSTRACT

A gas-charging and flanging machine (10) includes a sealed chamber (13a). The gas-charging and flanging machine is used for carrying out, inside the sealed chamber, charging of a gas into a workpiece (20) and flanging of the workpiece (20) by spinning and pressing. The gas-charging and flanging machine charges a gas into a workpiece and flanges the workpiece on the same machine such that production efficiency can be improved.

10 Claims, 30 Drawing Sheets

GAS-CHARGING AND FLANGING MACHINE

TECHNICAL FIELD

The present disclosure relates to the field of shock absorber processing, and in particular to a gas-charging and flanging machine.

BACKGROUND

At present, gas-charging and flanging of a shock absorber are processed by different machines. Gas-charging is carried out after flanging using a different machine, and as such production efficiency is low. During gas-charging, an insert needs to be inserted through a sealing ring of the shock absorber to be processed. Such an operation will easily damage the sealing ring and affect the sealing performance of the shock absorber assembly.

SUMMARY

The present disclosure aims to solve at least one of the technical problems existing in the prior art. To this end, the present disclosure is required to provide a gas-charging and flanging machine.

The present disclosure provides a gas-charging and flanging machine, including a sealed chamber, the gas-charging and flanging machine being used for carrying out, inside the sealed chamber, charging of a gas into a workpiece and flanging of the workpiece by spinning and pressing.

Preferably, the gas-charging and flanging machine further includes:
a gas-charging device; and
a spin-and-press flanging device, wherein the gas-charging device is used for charging the gas into the workpiece, and the spin-and-press flanging device is used for flanging the workpiece charged with the gas, the gas-charging device including:
a first clamping block;
a second clamping block;
a first clamping mechanism;
a second clamping mechanism; and
a gas intake nozzle, wherein the first clamping mechanism is used for driving the first clamping block to move, and the second clamping mechanism is used for driving the second clamping block to move, the first clamping block and the second clamping block are used for enclosing and forming the sealed chamber, the sealed chamber is in communication with the gas intake nozzle, the spin-and-press flanging device is a horizontal spin-and-press flanging device or a vertical spin-and-press flanging device, and the sealing chamber is used for housing the horizontal spin-and-press flanging device or the vertical spin-and-press flanging device.

Preferably, the first clamping mechanism includes a first clamping cylinder; a first cylinder seat; and a first clamping block seat, wherein the first clamping cylinder being mounted on the first cylinder seat, and the first clamping cylinder and the first clamping block being connected respectively to a left and right end of the first clamping block seat; and wherein the second clamping mechanism comprises a second clamping cylinder; a second cylinder seat; and a second clamping block seat, the second clamping cylinder being mounted on the second cylinder seat, and the second clamping cylinder and the second clamping block being connected respectively to a left and right end of the second clamping block seat.

Preferably, the second clamping block seat is provided with the gas intake nozzle, the second clamping block seat and the second clamping block together form a gas intake passage, and the gas intake passage is in communication with the gas intake nozzle and the sealing chamber.

Preferably, the spin-and-press flanging device includes:
a sealing wheel mounting disk;
a guiding mechanism; and
a spin-and-press mechanism, wherein the guiding mechanism and the spin-and-press mechanism are mounted on the sealing wheel mounting disk, the guiding mechanism is used for straightening the workpiece so that the workpiece is disposed coaxially with the spin-and-press flanging device, and the spin-and-press mechanism is used for spinning and pressing the workpiece so as to achieve flanging of the workpiece.

Preferably, the gas-charging and flanging machine further includes a fixing device for fixing the workpiece, the fixing device including:
a base;
a mounting bracket;
a positioning block;
a swinging rod;
a pressing rod;
a cylinder; and
a connecting rod, wherein the base includes a bottom plate and a fixing position disposed on the bottom plate, the fixing position is used for mounting the workpiece, the mounting bracket is fixed on the bottom plate, the positioning block is fixed on the mounting bracket, the cylinder is fixed on the mounting bracket, and the cylinder is used for driving the connecting rod, the swinging rod is rotatably mounted on the mounting bracket, the swinging rod comprises a first swinging rod and a second swinging rod connected to the first swinging rod, the first swinging rod is connected to the connecting rod, the second swinging rod is connected to the pressing rod, and the pressing rod is used for pressing the workpiece against the positioning block.

Preferably, the second swinging rod is formed with a mounting groove, the pressing rod comprises an abutting portion and a cylindrical portion connected to the abutting portion, the cylindrical portion is disposed in the mounting groove, a fixing nut is mounted on the cylindrical portion, the second swinging rod is located between the abutting portion and the fixing nut, and the abutting portion is used for abutting against the workpiece.

Preferably, the gas-charging and flanging machine further includes a driving mechanism and a screw rod, wherein the driving mechanism is used for driving the screw rod to rotate, and the screw rod is used for connecting a piston rod of the workpiece.

Preferably, the gas-charging and flanging machine further includes a load sensor; a sensor head; and a sensor push rod, the driving mechanism including a screw rod rotating motor; a screw rod rotating driving gear; and a screw rod rotating driven gear, wherein the motor is connected to the driving gear, the driving teeth meshes with the driven gear, the sensor push rod is disposed on the driven gear, the sensor push rod is facing screw rod, the sensor head is located directly above the sensor push rod, and the load sensor is electrically coupled to the sensor head.

Preferably, the gas-charging and flanging machine further includes a rod-extracting mechanism, the rod-extracting mechanism including a rod-extracting power device; a lifting frame; a moving plate; a screw threaded rod; and a screw threaded rod nut, wherein the screw rod is mounted on the moving plate, the moving plate is slidably mounted on the lifting frame, the screw rod and the moving plate are connected by the screw threaded rod nut, and the rod-extracting power device is used for driving the screw rod to rotate such that the moving plate moves up and down along the lifting frame.

Preferably, the rod-extracting power device includes a screw motor, a screw driving wheel, and a screw driven wheel. The screw motor may be connected to the screw driving wheel, and the screw driving wheel may be connected to the screw driven wheel. The screw driven wheel may be coupled to the screw threaded rod.

According to an embodiment of the gas-charging and flanging machine of the present disclosure, a shock absorber can be produced by charging a gas into the workpiece and flanging the workpiece on the same machine such that production efficiency can be improved.

A part of the additional aspects and advantages of the present disclosure will be given in the description below. Another part will become apparent from the description below, or will be understood by the practice of the present disclosure.

BRIEF DESCRIPTION OF THE DRAWINGS

The above and/or additional aspects and advantages of the present disclosure will become apparent and be easily understood in the description of the embodiments in conjunction with the following figures, wherein.

DETAILED DESCRIPTION

Figure 1:
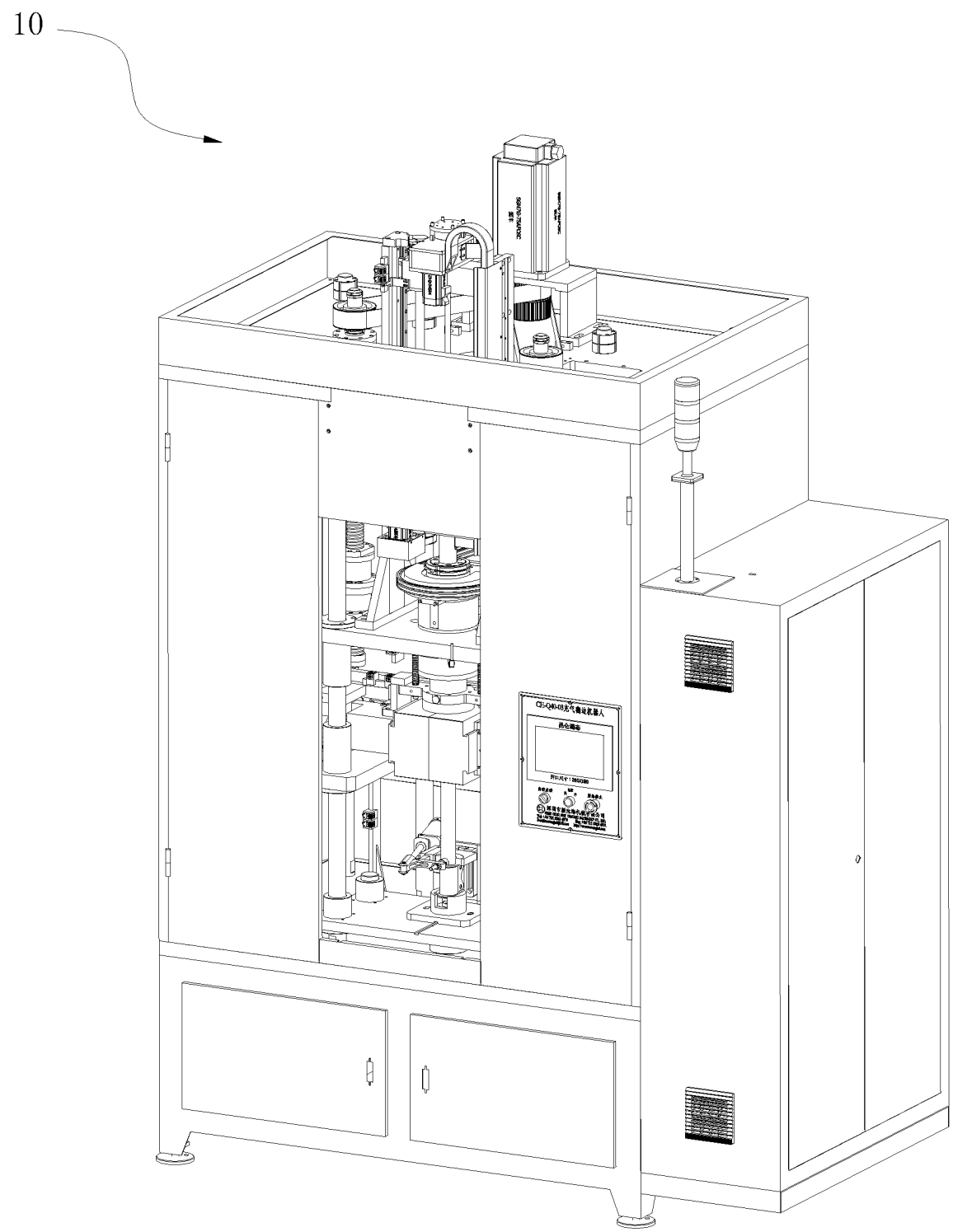
FIG. 1 is a perspective view of a gas-charging and flanging machine according to an embodiment of the present disclosure.

The embodiments of the present disclosure are described in detail below, and examples of the embodiments are illustrated in the drawings, wherein the same or similar reference numerals indicate the same or similar elements or elements having the same or similar functions. The following embodiments described with reference to the accompanying drawings are exemplary only for explaining the present disclosure and should not be construed as limiting the present disclosure.

In the description of the present disclosure, it is to be understood that the terms "center", "longitudinal", "lateral", "length", "width", "thickness", "upper", "lower", "front", "rear", "left", "right", "vertical", "horizontal", "top", "bottom", "inner", "outer", "clockwise", "counterclockwise", etc. are based on the orientation or positional relationship shown in the drawings, and are merely for the convenience of the description of the present disclosure and simplification of the description. It does not indicate or imply that the device or component referred to has a specific orientation, and is constructed and operated in a specific orientation. Therefore, it should not be construed as a limitation of the present disclosure. Moreover, the terms "first" and "second" are used for descriptive purposes only and are not to be construed as indicating or implying a relative importance or implicitly indicating the number of technical features indicated. Thus, features defining "first" or "second" may include one or more of the described features either explicitly or implicitly. In the description of the present disclosure, the meaning of "plurality" is two or more unless specifically and specifically defined otherwise.

In the description of the present application, it should be noted that the terms "mounted", "connected", and "connected" are to be interpreted broadly unless otherwise explicitly defined. For example, the elements may be fixedly or detachably connected, connected as one piece, mechanically connected, electrically connected, communicating with each other, directly or indirectly connected through an intermediate medium, internal communication of two elements, or interaction of two elements. The specific meanings of the above terms in the present application can be understood by those skilled in the art on a case-by-case basis.

In the present disclosure, unless otherwise specifically define, a first feature is disposed "on" or "under" a second feature may include direct contact of the first and second features, and may also include indirect contact of the first and second features through additional features between them. Moreover, a first feature is disposed "on", "over" and "above" a second feature may include the first feature being directly above and obliquely above the second feature, or merely indicating that the level of the first feature being higher than the second feature. A first feature is disposed "below", "under" and "beneath" a second feature may include the first feature being directly below and obliquely below the second feature, or merely the level of the first feature being lower than the second feature.

The following description provides many different embodiments or examples for implementing different structures of the present disclosure. In order to simplify the description of the present disclosure, components and arrangement of some specific examples are described below. Of course, they are merely examples and are not intended to be limiting. In addition, the description may be repeated with reference numerals and/or reference characters in various examples, which are for the purpose of simplicity and clarity, and do not indicate the relationship between the various embodiments and/or arrangements discussed. Further, the following description provides various specific examples of materials and processes, but one of ordinary skill in the art may be aware that other processes and/or other materials may be used.

Figure 2:
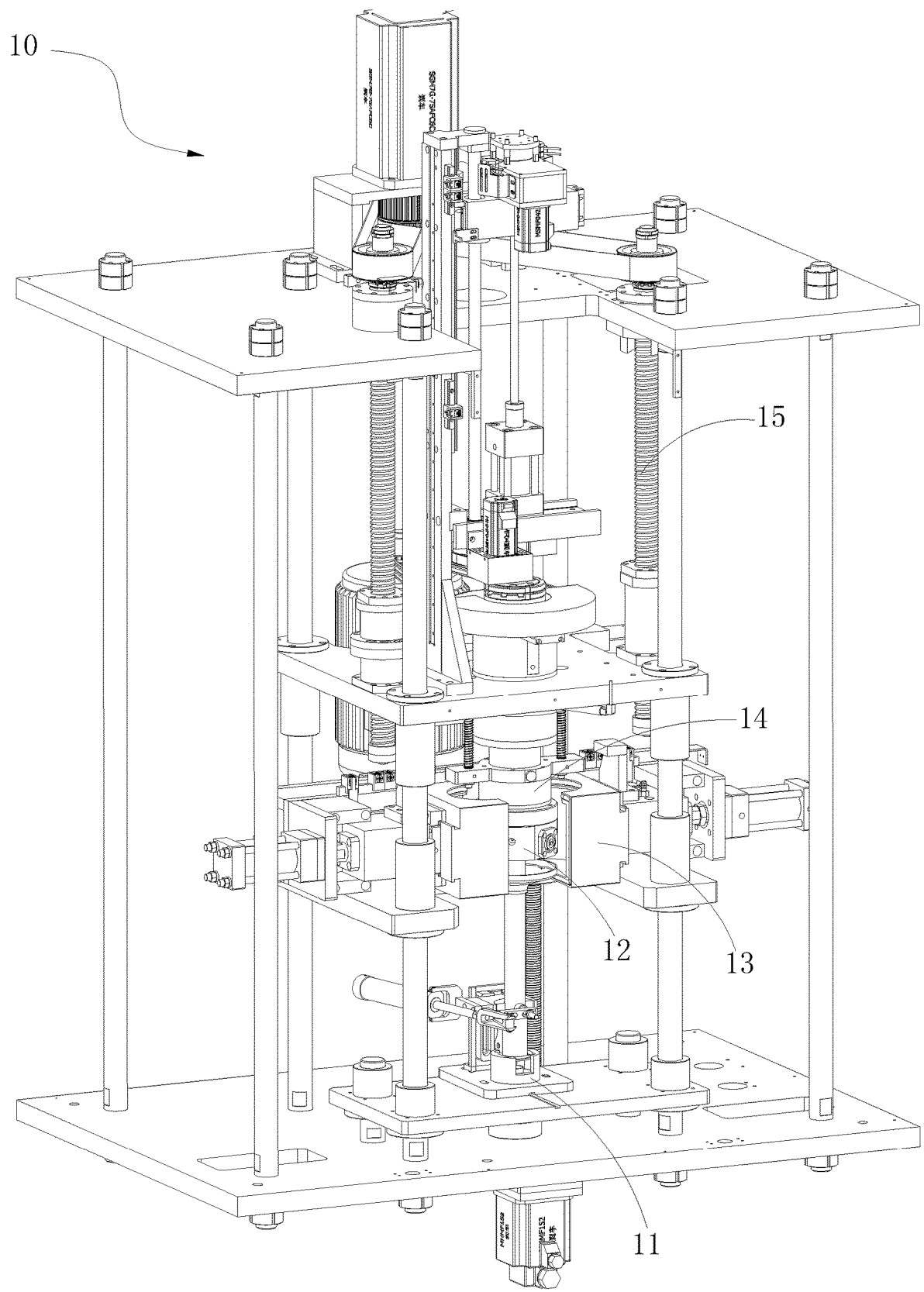
FIG. 2 is another perspective view of the gas-charging and flanging machine according to an embodiment of the present disclosure.
Figure 3:
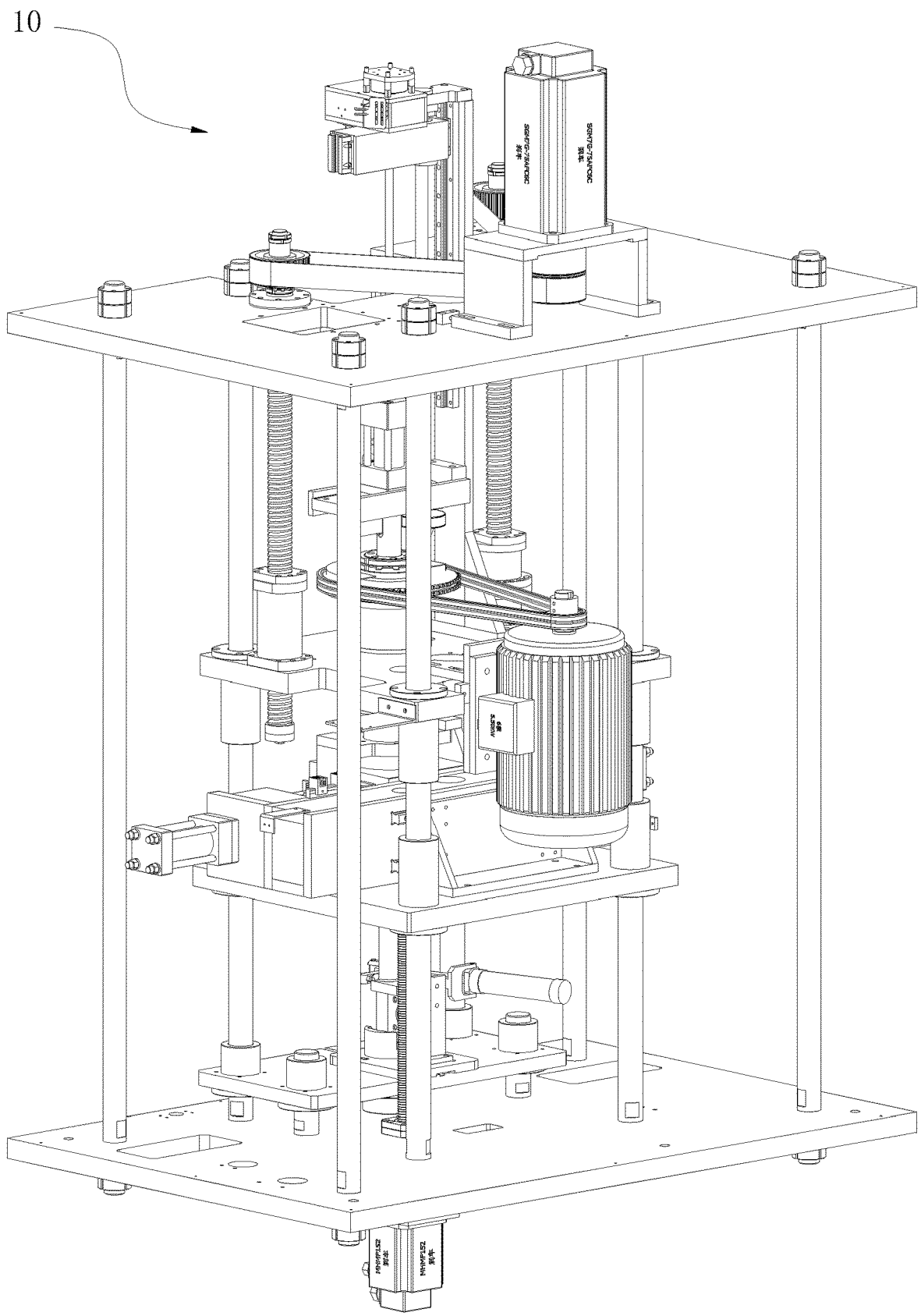
FIG. 3 is yet another perspective view of the gas-charging and flanging machine according to an embodiment of the present disclosure.
Figure 4:
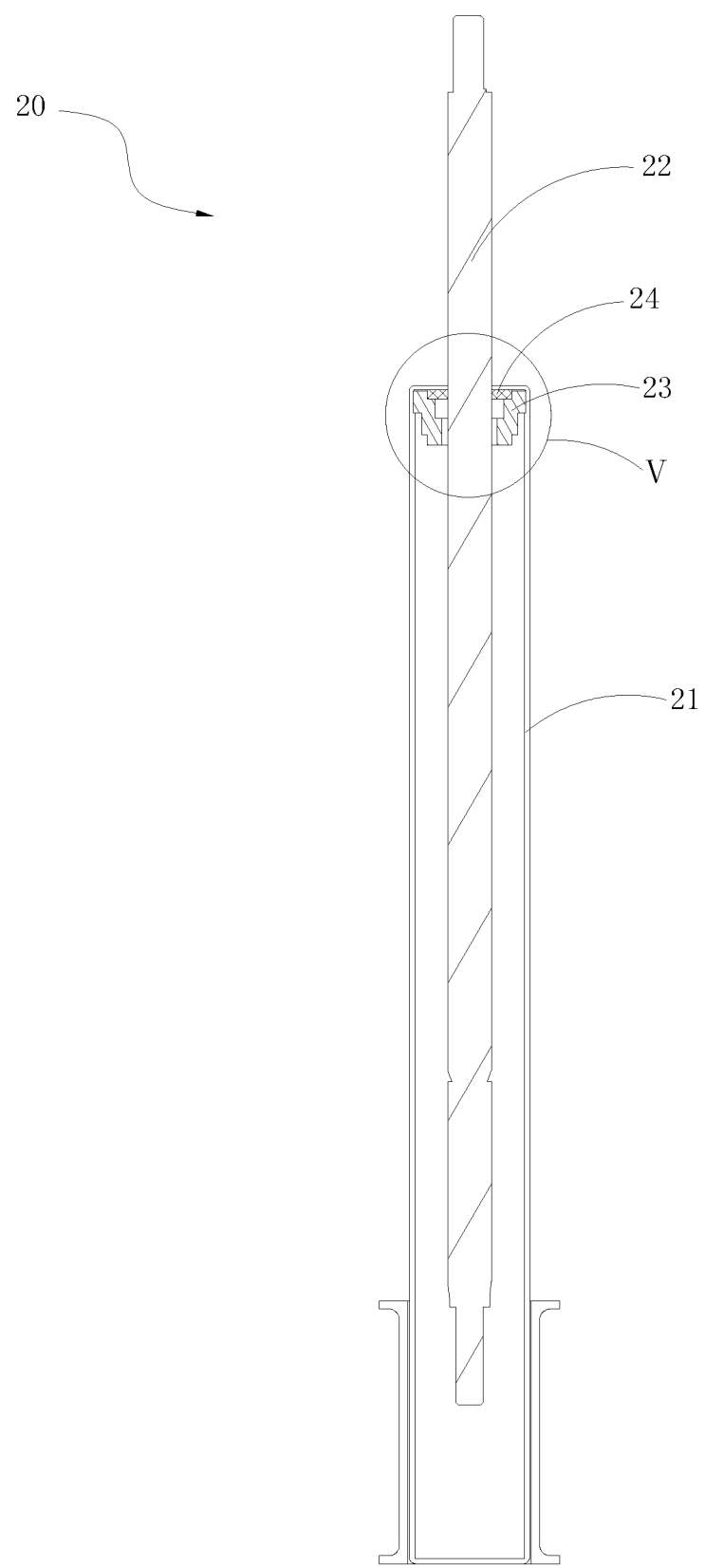
FIG. 4 is a schematic view of a workpiece.
Figure 5:
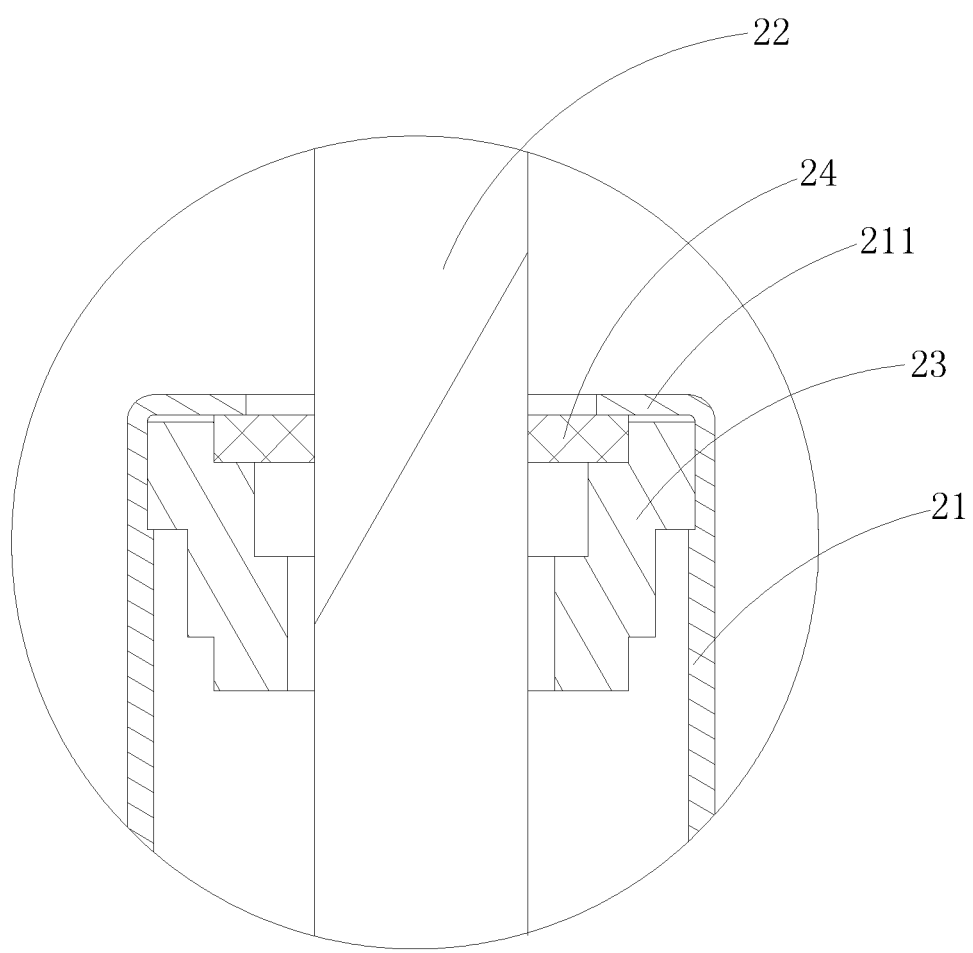
FIG. 5 is an enlarged schematic view of portion V of the workpiece of FIG. 4.
Figure 12:
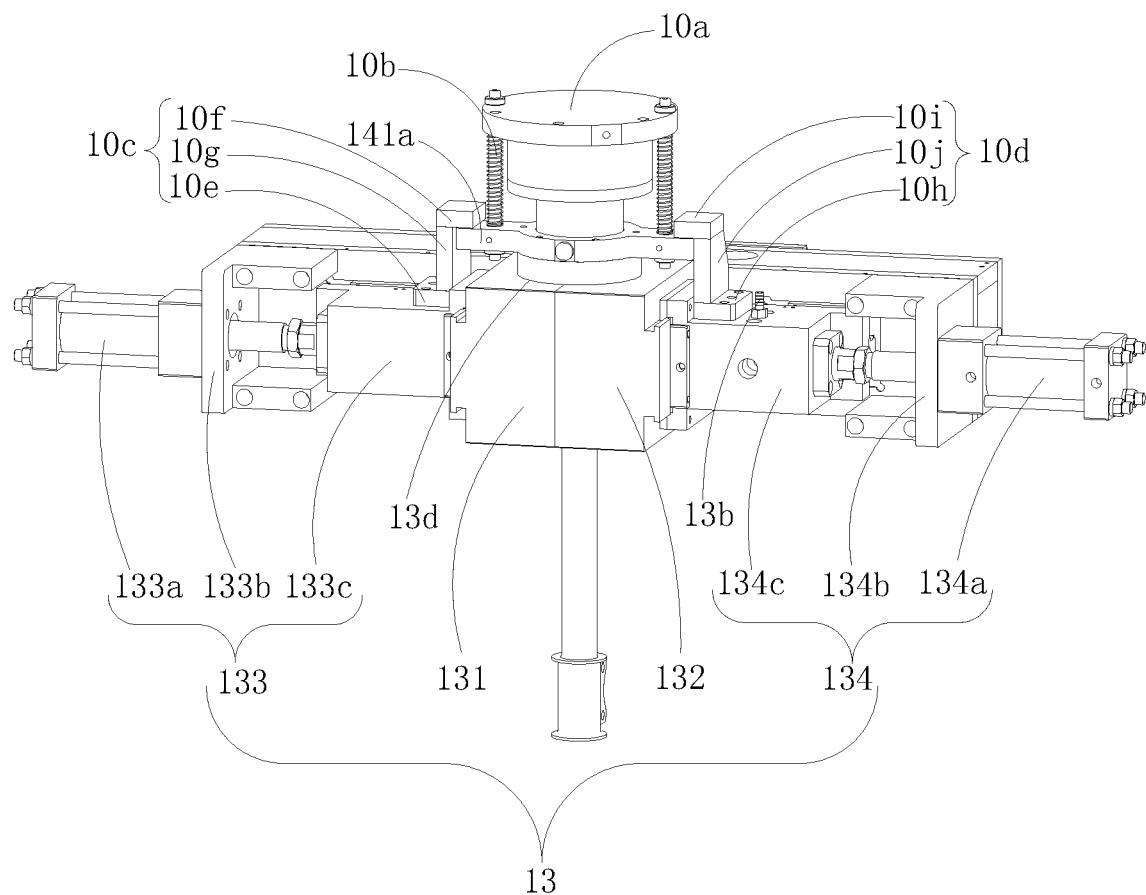
FIG. 12 is a schematic view showing a gas-charging device and a rotary sealing device of the gas-charging and flanging machine according to an embodiment of the present disclosure.
Figure 13:
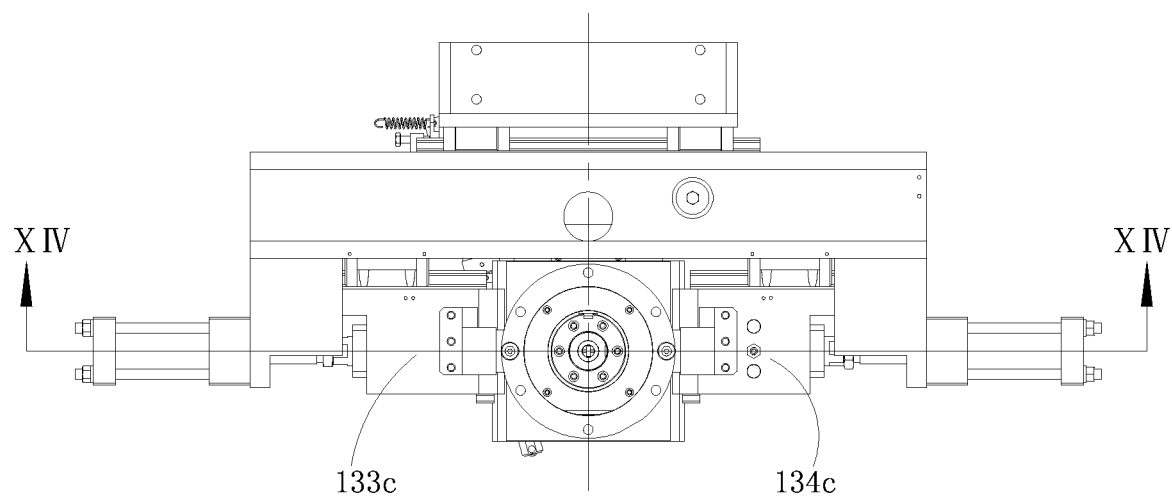
FIG. 13 is a schematic view showing a gas-charging device and a rotary sealing device of the gas-charging and flanging machine according to an embodiment of the present disclosure.

Referring to FIGS. 2, 12 and 13, a gas-charging and flanging machine 10, according to an embodiment of the present disclosure, may include a sealed chamber 13a. The gas-charging and flanging machine 10 can be used for carrying out, inside the sealed chamber 13a, charging of a gas into a workpiece 20 and flanging of the workpiece 20 by spinning and pressing.

The gas-charging and flanging machine 10, according to an embodiment of the present disclosure can improve the efficiency of production of a shock absorber by charging a gas into the workpiece 20 and flanging the workpiece 20 by spinning and pressing on the same machine.

The gas-charging and flanging machine 10 may include a gas-charging device 13 and a spin-and-press flanging device 12. The gas-charging device 13 can be used for charging a gas into the workpiece 20. The spin-and-press flanging device 12 can be used for flanging the workpiece 20 charged with the gas. The gas-charging device 13 may include a first clamping block 131, a second clamping block 132, a first clamping mechanism 133, a second clamping mechanism 134, and a gas intake nozzle 13b. The first clamping mechanism 133 can be used for driving the first clamping block 131 to move, and the second clamping mechanism 134 can be used for driving the second clamping block 132 to move. The first clamping block 131 and the second clamping block 132 can be used for enclosing and forming the sealed chamber 13a. The sealed chamber 13a may be in communication with the gas intake nozzle 13b. The sealed chamber 13a may be used for housing the spin-and-press flanging device 12.

The gas-charging and flanging machine 10 of the embodiment of the present disclosure realizes gas-charging and flanging the workpiece 20 on the same machine by installing the gas-charging device 13 and the spin-and-press flanging device 12 and producing a shock absorber, thereby improving production efficiency.

Referring to FIG. 1 to FIG. 5, the gas-charging and flanging machine 10 of the embodiment of the present disclosure first charging a gas into the workpiece 20, and then flanges the workpiece 20 to produce a shock absorber. The workpiece 20 may include a cylindrical oil storage cylinder 21, a piston rod 22, a guiding mechanism 23 and an oil seal 24. The oil storage cylinder 21 may include a bottom end and a top end opposite to the bottom end. The bottom end may be a closed end. The piston rod 22 may be inserted into the oil storage cylinder 21 from the top end of the oil storage cylinder 21 and may be partially exposed out of the oil storage cylinder 21. The top end of the oil storage cylinder 21 may be provided with the guiding mechanism 23. The guiding mechanism 23 may be sleeved on the piston rod 22. The guiding mechanism 23 may be placed between the oil storage cylinder 21 and the piston rod 22. The oil seal 24 may be disposed at the top end of the oil storage cylinder 21. The oil seal 24 may be used for sealing the top end of the oil storage cylinder 21. The oil seal 24 may sleeve on the piston rod 22 and abut against the guiding mechanism 23. After the workpiece 20 has been flanged by the gas-charging and flanging machine 10, the top end of the oil storage cylinder 21 may be folded up to compress the oil seal 24.

The gas-charging and flanging machine 10 may include a fixing device 11, a spin-and-press flanging device 12, a gas-charging device 13, a rotary sealing device 14, and a double screw pin pressure feeding device 15. The fixing device 11 may be used for fixing the workpiece 20. The gas-charging device 13 may be used for charging a gas into the workpiece 20. The spin-and-press flanging device 12 may be used for flanging the workpiece 20. The rotary sealing device 14 may be used for ensuring the gas sealing capacity during gas-charging and flanging of the workpiece 20. The double screw pin pressure feeding device 15 may be used to control the lifting of the spin-and-press flanging device 12.

Figure 6:
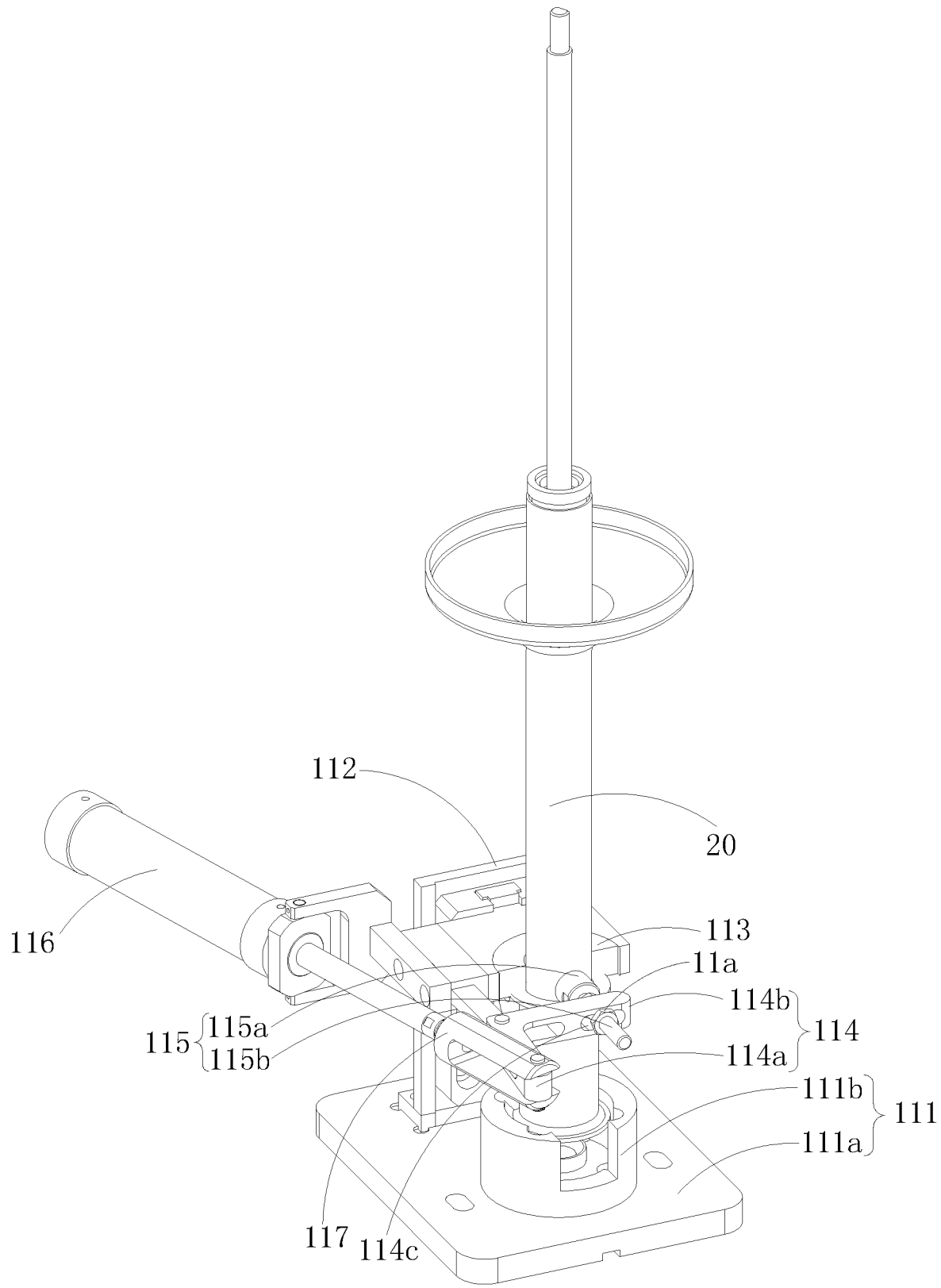
FIG. 6 is a schematic view of a fixing device of the gas-charging and flanging machine according to an embodiment of the present disclosure.
Figure 7:
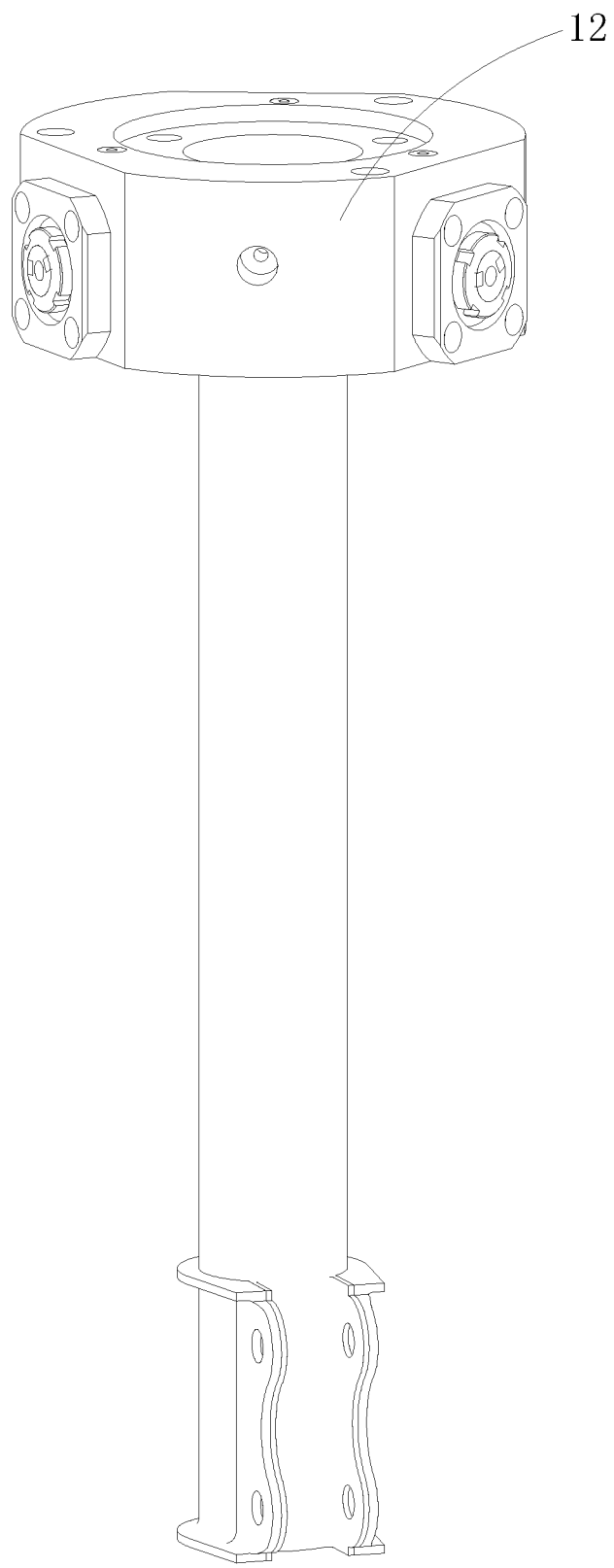
FIG. 7 is a perspective view showing a spin-and-press flanging device of the gas-charging and flanging machine according to an embodiment of the present disclosure.
Figure 8:
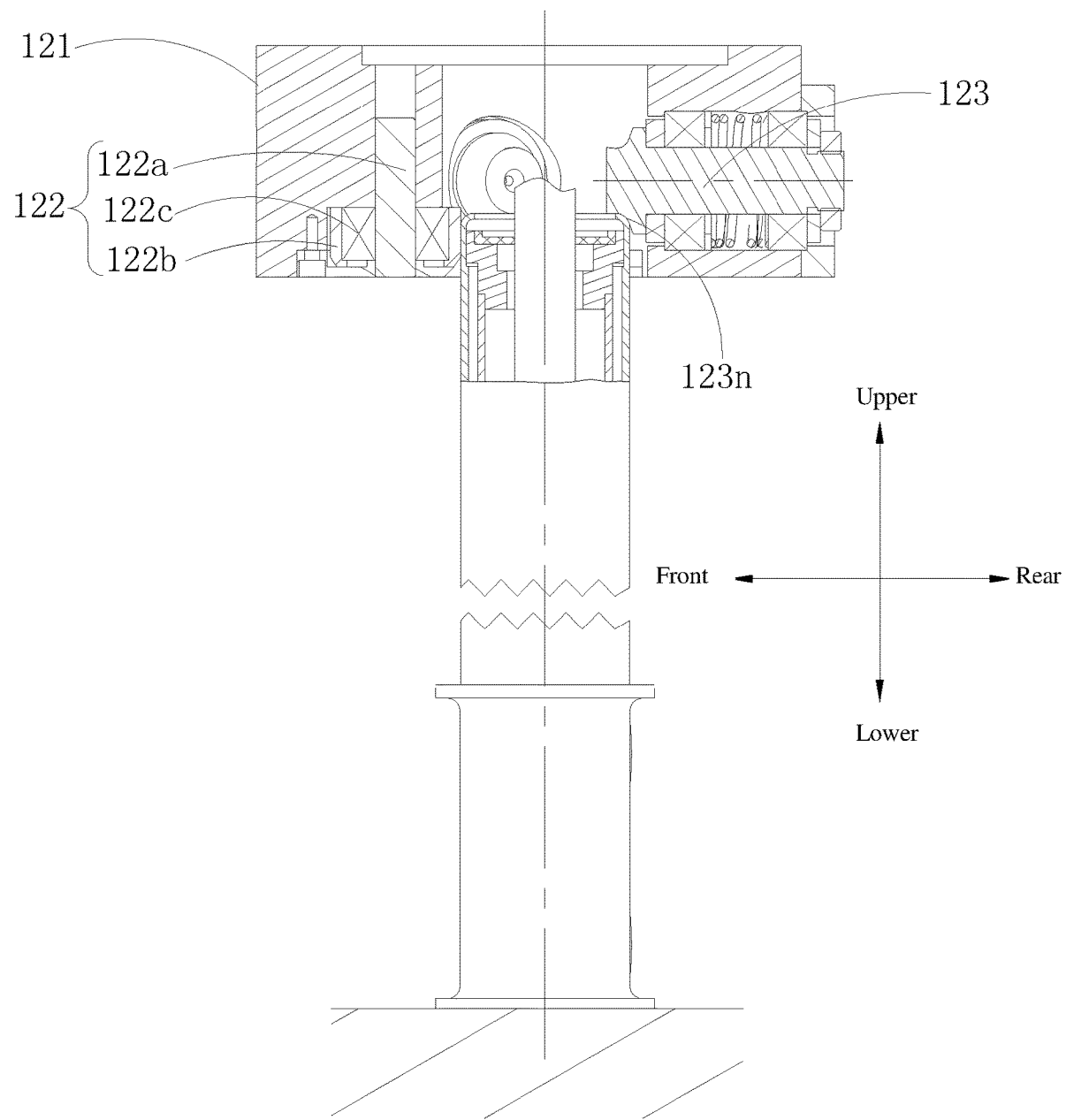
FIG. 8 is a schematic view showing the pre-flanging state of the spin-and-press flanging device of the gas-charging and flanging machine according to an embodiment of the present disclosure.
Figure 9:
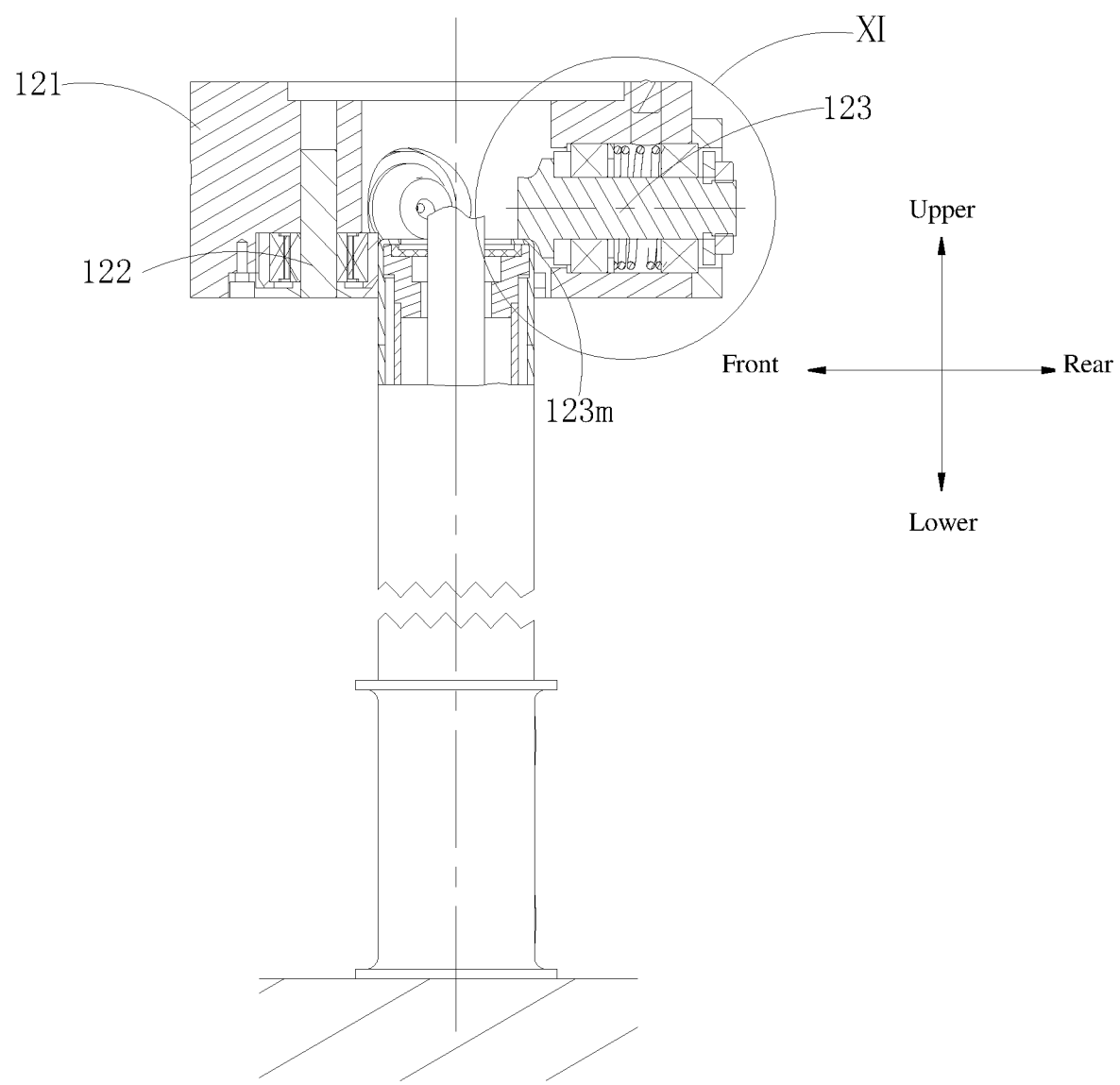
FIG. 9 is a schematic view showing the flange formation state of the spin-and-press flanging device of the gas-charging and flanging machine according to an embodiment of the present disclosure.
Figure 10:
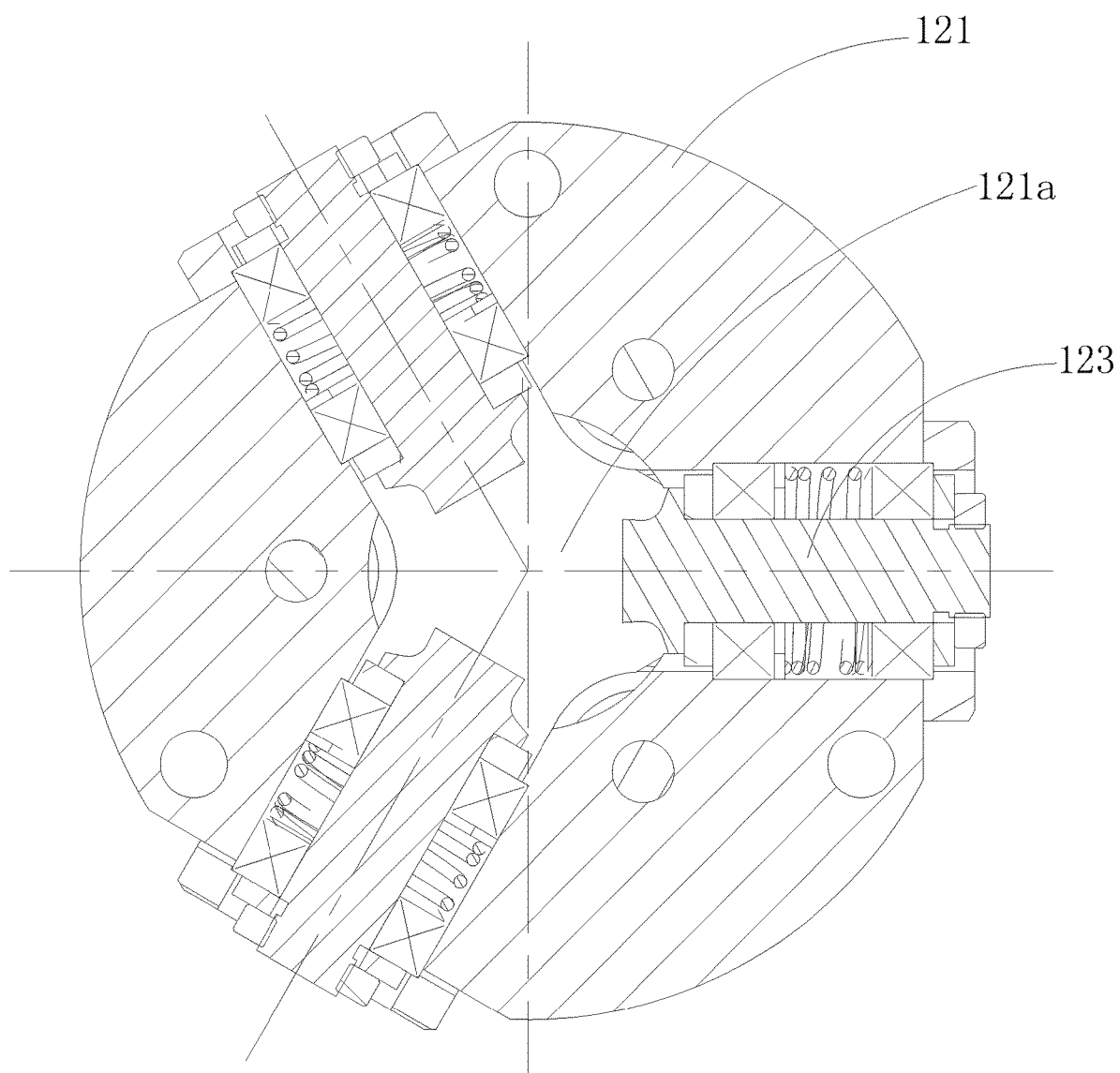
FIG. 10 is a cross-sectional view of the spin-and-press flanging device of the gas-charging and flanging machine according to an embodiment of the present disclosure.
Figure 11:
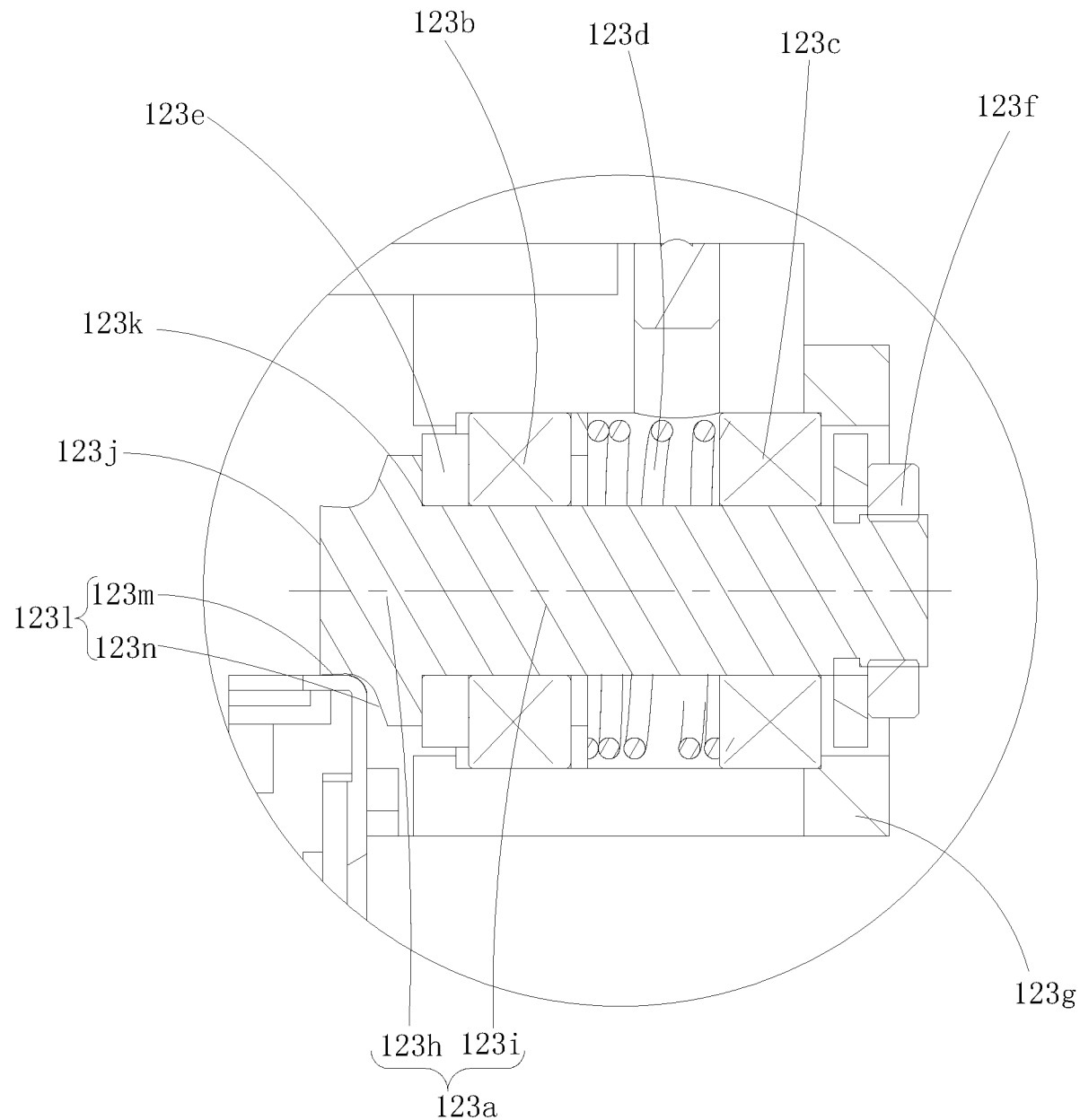
FIG. 11 is an enlarged schematic view showing portion XI of the spin-and-press flanging device of FIG. 9.

Referring to FIG. 6, in the present embodiment, the fixing device 11 may include a base 111, a mounting bracket 112, a positioning block 113, a swinging rod 114, a pressing rod 115, a cylinder 116, and a connecting rod 117. The base 111 may be used for mounting the workpiece 20. The base 111 may include a bottom plate 111*a*, and a cylindrical fixing position 111*b* disposed on the bottom plate 111*a*. The fixing position 111*b* may be used for mounting the workpiece 20. The mounting bracket 112 may be fixed to the bottom plate 111*a*. The positioning block 113 may be fixed to the mounting bracket 112 and may be semi-annular in shape. The positioning block 113 may be located above the fixing position 111*b*. The cylinder 116 may be used for driving the connecting rod 117. The cylinder 116 may be fixed on the mounting bracket 112 and may be connected to the connecting rod 117. The swinging rod 114 may be rotatably disposed on the mounting bracket 112 and may be L-shaped. The swinging rod 114 may include a first swinging rod 114*a* and a second swinging rod 114*b* connected to the first swinging rod 114*a*. One end of the first swinging rod 114*a* may be connected with the connecting rod 117 and the second swinging rod 114*b* may be connected with the pressing rod 115. The pressing rod 115 may be used for pressing the workpiece 20 on the positioning block 113. Specifically, the second swinging rod 114*b* may be formed with a mounting groove 114*c*. The pressing rod 115 may include a cylindrical abutting portion 115*a*, and a cylindrical portion 115*b* connected to the abutting portion 115*a*. The cylindrical abutting portion 115*a* may be coaxially disposed with the cylindrical portion 115*b*. The diameter of the abutting portion 115*a* may be larger than the diameter of the cylindrical portion 115*b*. The cylindrical portion 115*b* may be disposed in the mounting groove 114*c*. A fixing nut 11*a* may be attached to the cylindrical portion 115*b*, and the second swing rod 114*b* may be located between the abutting portion 115*a* and the fixing nut 11*a*. When the gas-charging and flanging machine 10 is in operation, the bottom end of the workpiece 20 may be mounted on the fixed position 111*b*. The positioning portion may be wrapped on an outer side of the workpiece 20. The cylinder 116 can drive the connecting rod 117 to move forward so that the second swinging rod 114*b* may be pressed against the abutting portion 115*a*, and the abutting portion 115*a* may press the workpiece 20 against the positioning block 113. After operation of the gas-charging and flanging machine 10 is completed, the cylinder 116 can drive the connecting rod 117 to move rearward so that the pressing rod 115 can release the workpiece 20.

Referring to FIG. 7 to FIG. 11, in the embodiment, the spin-and-press flanging device 12 may be a horizontal spin-and-press flanging device. The horizontal spin-and-press flanging device 12 may include a sealing wheel mounting disk 121, a guiding mechanism 122, and a spin-and-press mechanism 123. The guiding mechanism 122 may be mounted in the sealing wheel mounting disk 121, and the guiding mechanism 122 can be used to straighten the workpiece 20 such that the workpiece 20 can be coaxially disposed with the spin-and-press flanging device 12. The spin-and-press mechanism 123 may be used to spin the workpiece 20 and achieve the flanging of the workpiece 20. The sealing wheel mounting disk 121 may be cylindrical in shape. A cylindrical machining chamber 121*a* may be formed at the center of the sealing wheel mounting disk 121. The guiding mechanism 122 may be disposed in the sealing wheel mounting disk 121. The number of the guiding mechanism 122 may be three, and the three guiding mechanisms 122 may be evenly distributed along the circumferential direction of the sealing wheel mounting disk 121. Each guiding mechanism 122 may include a guiding shaft 122*a*, a guiding wheel 122*b*, and a guiding bearing 122*c*. The guiding shaft 122*a* may be fixed in the sealing wheel mounting disk 121, and the guiding wheel 122*b* may be sleeved on the guiding shaft 122*a* between the guiding wheel 122*b* and the guiding shaft 122*a* with the guide bearing 122*c* mounted in between.

In the present embodiment, the number of spin-and-press mechanism 123 may be three. The three spin-and-press mechanisms 123 may be evenly distributed along the circumferential direction of the sealing wheel mounting disk 121. The guiding mechanism 122 may be sandwiched between two adjacent spin-and-press mechanisms 123. The spin-and-press mechanism 123 may include a spin-and-press wheel 123*a*, a first bearing 123*b*, a second bearing 123*c*, a compressing spring 123*d*, an adjusting pad 123*e*, a lock nut 123*f*, and a spin-and-press shaft end cover 123*g*. The spin-and-press wheel 123*a* may include a spin-and-press portion 123*h* and a spin-and-press shaft 123*i* connected to the spin-and-press portion 123*h*. The spin-and-press portion 123*h* may have a substantially truncated cone shape. The spin-and-press portion 123*h* may include a first end 123*j*, a second end 123*k* opposite to the first end 123*j*, and a spin-and-press surface 1231 connecting the first end 123*j* and the second end 123*k*. The spin-and-press surface 1231 may be formed with a linear spin-and-press section 123*m* and a circular arc spin-and-press section 123*n* connected to the linear spin-and-press section 123*m*. The front end of the spin-and-press shaft 123*i* may be connected to the second end 123*k*. The spin-and-press shaft 123*i* may be disposed in a radial direction of the sealing wheel mounting disk 121, and the first end 123*j* of the spin-and-press portion 123*h* may be facing the center of the sealing wheel mounting disk 121. The first bearing 123*b*, the second bearing 123*c*, and the compressing spring 123*d* may be sleeved on the spin-and-press shaft 123*i*. The compressing spring 123*d* may be interposed between the first bearing 123*b* and the second bearing 123*c*. The adjusting pad 123*e* may be interposed between the first end 123*j* of the spin-and-press portion 123*h* and the first bearing 123*b*. The locking nut 123*f* may be fixed to the rear end of the spin-and-press shaft 123*i*. The first bearing 123*b*, the second bearing 123*c* and the compressing spring 123*d* may be located between the second end 123*k* of the spin-and-press portion 123*h* and the rear end of the spin-and-press shaft 123*i*. The outer side surface of the sealing wheel mounting disk 121 may be fixed with the spin-and-press shaft end cover 123*g*. The rear end of the locking nut 123*f* and the spin-and-press shaft 123*i* may be exposed to the outside through the spin-and-press shaft end cover 123*g*.

The spin-and-press flanging device 12 may include two working processes, which may be respectively pre-flanging and flange-forming. During pre-flanging, the position of the workpiece 20 to be flanged may be located in a processing cavity 121*a* of the sealing wheel mounting disk 121. The three evenly disposed guiding wheel 122*b* can straighten the workpiece 20. The sealing wheel mounting disk rotates at a high speed and presses down. The upper end of the oil storage cylinder 21 of the workpiece 20 spun and pressed into a slanted face by the circular arc spin-and-press section 123n of the spin-and-press wheel 123a. During flange-forming, the sealing wheel mounting disk 121 spins at high speed and presses at the same time. The flanging pressure may increase and force the spin-and-press shaft 123i to move with the adjusting pad 123e and the first bearing 123b, and then move the compressing spring 123d. At this time, the spin-and-press point changes from the circular arc spin-and-press section 123n to the linear spin-and-press section 123m. The linear spin-and-press section 123m of the spin-and-press wheel 123a spins, presses and bends the upper end of the oil storage cylinder 21 of the workpiece 20 into a flange portion 211 parallel to the linear spin-and-press section 123m. The flange portion 211 presses the oil seal 24 of the oil storage cylinder 21 and seals the upper end of the oil storage cylinder 21.

Figure 31:
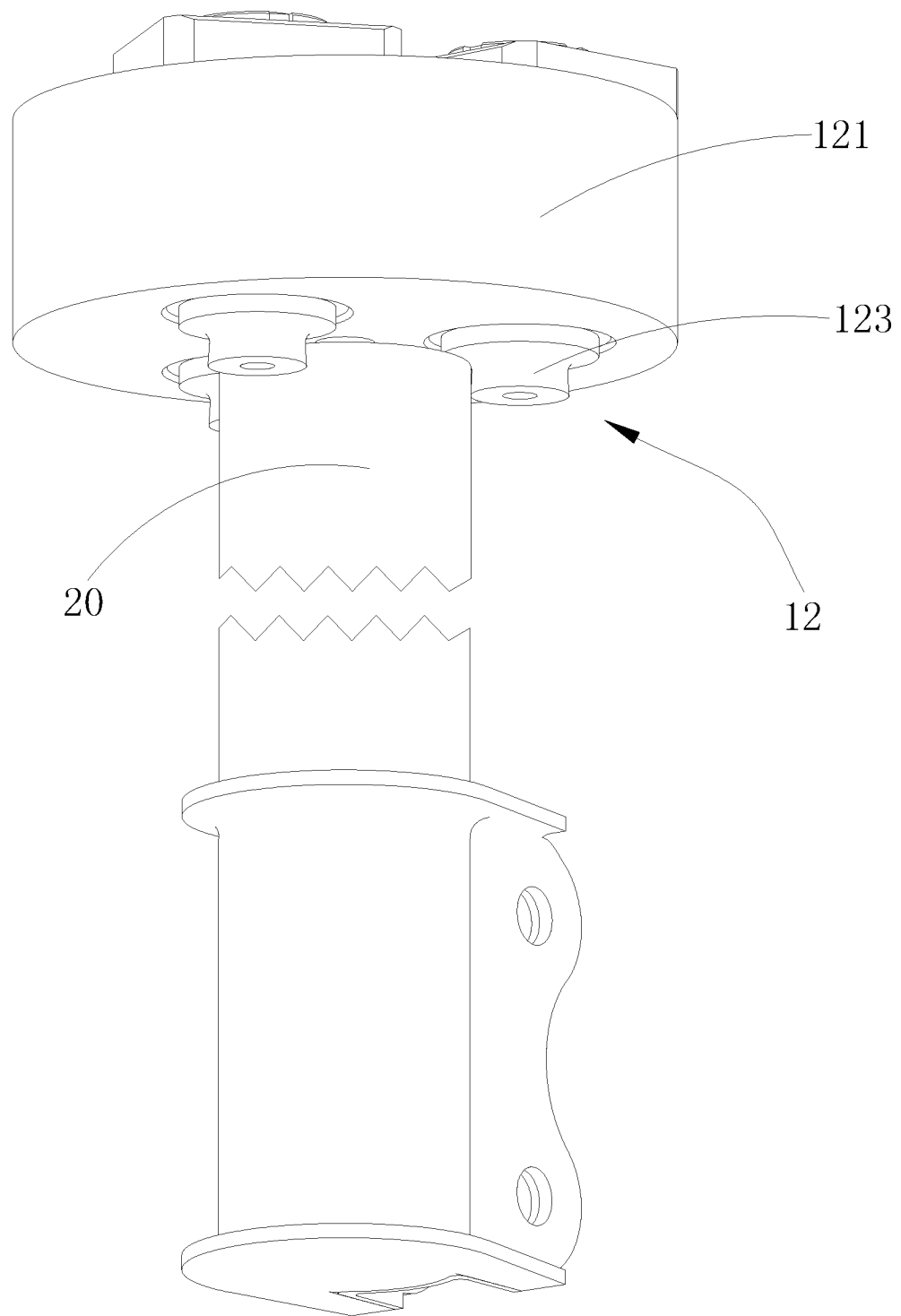
FIG. 31 is a perspective view showing a spin-and-press flanging device of the gas-charging and flanging machine according to an embodiment of the present disclosure.
Figure 32:
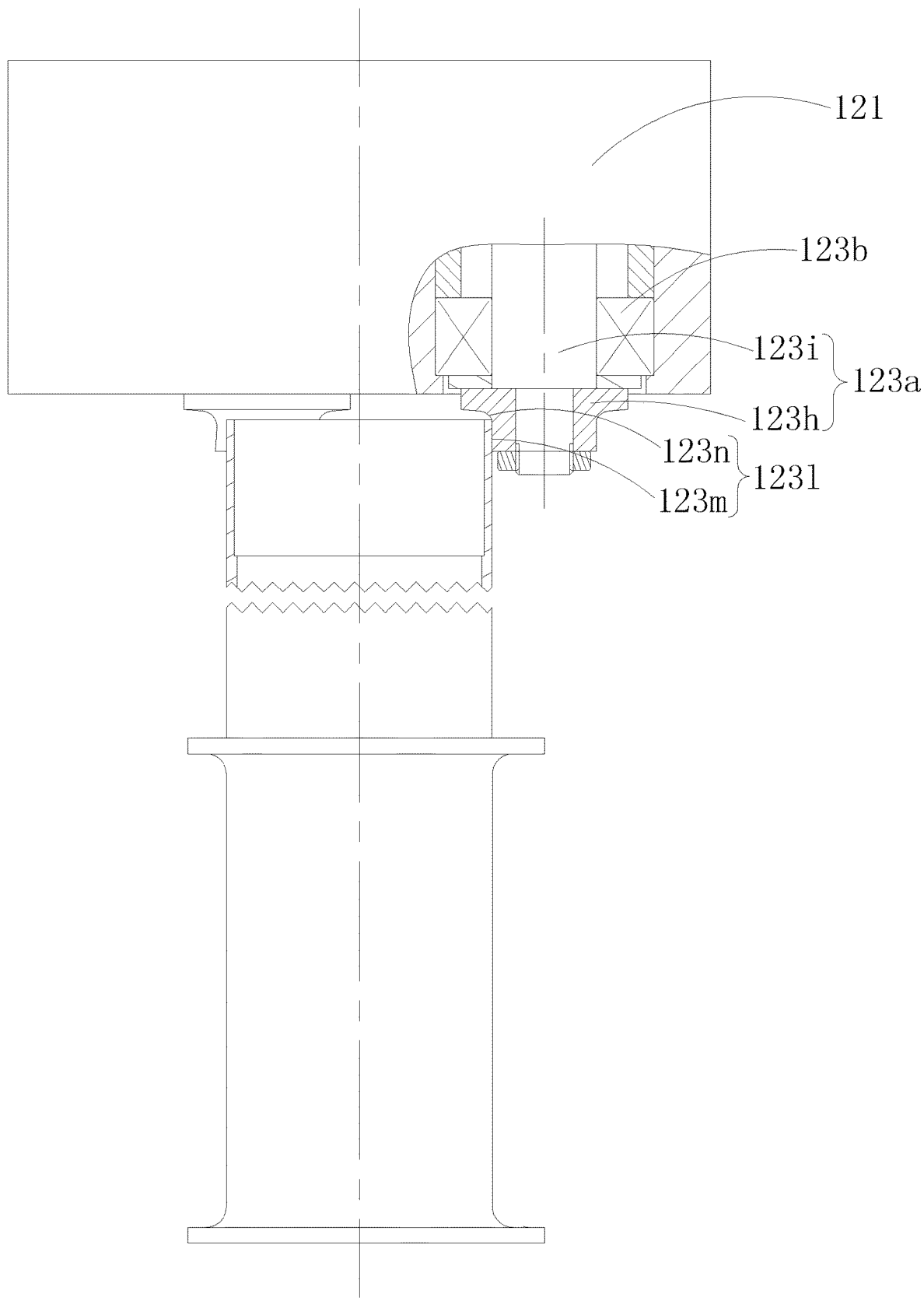
FIG. 32 is a partial cross-sectional view showing a spin-and-press flanging device of the gas-charging and flanging machine according to an embodiment of the present disclosure.

Referring to FIG. 31 and FIG. 32, in another embodiment, the spin-and-press flanging device 12 may be a vertical spin-and-press flanging device. The vertical spin-and-press flanging device 12 may include a sealing wheel mounting disk 121, a guiding mechanism 122, and a spin-and-press mechanism 123. The guiding mechanism 122 and the spin-and-press mechanism 123 may be mounted in the sealing wheel mounting disk 121, and the guiding mechanism 122 can be used to straighten the workpiece 20 such that the workpiece 20 can be coaxially disposed with the spin-and-press flanging device 12. The spin-and-press mechanism 123 may be used to spin the workpiece 20 and achieve the flanging of the workpiece 20. The sealing wheel mounting disk 121 may be cylindrical in shape. A cylindrical machining chamber 121a may be formed at the center of the sealing wheel mounting disk 121. The number of the spin-and-press mechanism 123 may be three. The three spin-and-press mechanisms 123 may be spaced apart from each other in the axial direction of the sealing wheel mounting disk 121. Each spin-and-press mechanism 123 may include a spin-and-press wheel 123a, a first bearing 123b, a second bearing, a compressing spring, an adjusting pad, a lock nut, and a spin-and-press shaft end cover. The spin-and-press wheel 123a may include a spin-and-press portion 123h and a spin-and-press shaft 123i connected to the spin-and-press portion 123h. The spin-and-press portion 123h may be substantially in the shape of a circular platform. The outer peripheral surface of the spin-and-press portion 123h may be formed with a spin-and-press surface 1231. The spin-and-press surface 1231 may be formed with the linear spin-and-press section 123m and the circular arc spin-and-press section 123n connected to the linear spin-and-press section 123m. The axial direction of the spin-and-press shaft 123i may be parallel to the axial direction of the sealing wheel mounting disk 121. The first bearing 123b, the second bearing, and the compressing spring may be sleeved on the spin-and-press shaft 123i. The compressing spring may be interposed between the first bearing 123b and the second bearing. The adjusting pad may be interposed between one end of the spin-and-press portion 123h and the first bearing 123b. The locking nut may be fixed to the upper end of the spin-and-press shaft 123i. The first bearing 123b, the second bearing and the compressing spring may be interposed between one end of the spin-and-press portion 123h and the upper end of the spin-and-press shaft 123i. The spin-and-press portion 123h may pass through the bottom surface of the sealing wheel mounting disk 121 and expose to the outside.

Figure 14:
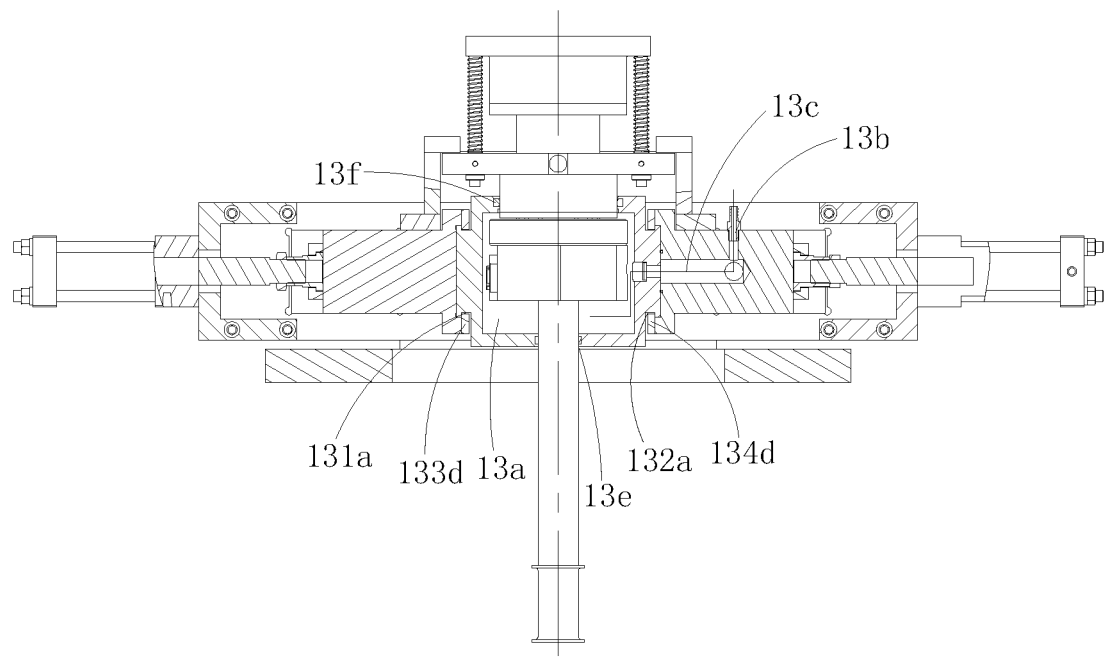
FIG. 14 is a cross-sectional view of the gas-charging device of FIG. 13 taken along XIV-XIV.

Referring to FIG. 12 to FIG. 14, in the embodiment, the gas-charging device 13 may include a first clamping block 131, a second clamping block 132, a first clamping mechanism 133 and a second clamping mechanism 134. The first clamping block 131 and the second clamping block 132 may be used for enclosing and forming the sealed chamber 13a. The spin-and-press flanging device 12 may be received in the sealing chamber 13a. The first clamping mechanism 133 may include a first clamping cylinder 133a, a first cylinder block 133b, and a first clamping block seat 133c. The first clamping cylinder 133a may be mounted on the first cylinder block 133b. The first clamping cylinder 133a and the first clamping block 131 may be respectively connected to the left and right ends of the first clamping block seat 133c. The first clamping cylinder 133a drives the first clamp block 131 to move through the first clamp block 133c. The second clamping mechanism 134 may include a second clamping cylinder 134a, a second cylinder block 134b and a second clamping block seat 134c. The second clamping cylinder 134a may be mounted on the second cylinder block 134b. The left and right ends of the second clamping block seat 134c may be respectively connected to the second clamping block 132 and the second clamping cylinder 134a. The second clamping cylinder 134a drives the second clamping block 132 to move through the second clamping block seat 134c. The second clamping block seat 134c may be provided with the gas intake nozzle 13b. The gas intake nozzle 13b can communicate with the sealed chamber 13a.

Specifically, the first clamping block seat 133c may be substantially in the shape of a cuboid. The left end of the first clamping block seat 133c may be connected to the first clamping cylinder 133a. The right end of the first clamping block seat 133c may abut on the left side of the first clamping block 131. Two first hooks 133d may be disposed at the right end of the first clamp block 133c. The two first hooks 133d may be respectively fixed to the upper surface and the lower surface of the first clamp block 133c. The surface on the left side of the first clamp block 131 may be formed with two corresponding first slots 131a. Each of the first hooks 133d may be engaged in a first slot 131a. The second clamping block seat 134c may be substantially in the shape of a cuboid. The left end of the second clamping block seat 134c may abut on the surface of the right side of the second clamping block 132. The right end of the second clamping block seat 134c may be connected with the second clamping cylinder 134a. The two second hooks 134d may be disposed at the left end of the second clamp block 134c. The two second hooks 134d may be respectively fixed to the upper surface and the lower surface of the second clamp block 134c. The surface of the right side of the second clamp block 132 may be formed with two corresponding second slots 132a. Each of the second hooks 134d may be engaged in a second slot 132a.

In the present embodiment, the upper surface of the second clamping block seat 134c may be provided with a gas intake nozzle 13b. The second clamping block seat 134c and the second clamping block 132 may together form a gas intake passage 13c. The gas intake passage 13c, the gas intake nozzle 13b and the sealed chamber 13a may be in communication with each other. The left side of the first clamping block 131 may be formed with a first edge, and the left side of the second clamping block 132 may be formed with a second edge. The first edge may abut on the second edge to form the sealed chamber 13a. The first edge and the second edge may be provided with sealing layers to ensure the sealing property when the first clamping block 131 and the second clamping block 132 enclose. The upper surface of each of the first clamping block 131 and the second clamping block 132 may be formed with a first semicircular groove. The two first semicircular grooves may be symmetrically arranged. The two first semicircular grooves can be enclosed to form a first coupling sleeve 13d. The first coupling sleeve 13d may be used for engaging with the rotary sealing device 14. The lower surfaces of the first clamping block 131 and the second clamping block 132 may be respectively formed with two second semicircular grooves. The two second semicircular grooves may be symmetrically disposed. The two second semicircular grooves may enclose to form a second coupling sleeve 13e. The second coupling sleeve 13e may be used for engaging the oil storage cylinder 21 of the workpiece 20. Each of the first coupling sleeve 13d and the second coupling sleeve 13e may be provided with a seal ring 13f to ensure the sealing of the coupling region.

The operating process of the gas-charging device 13 is: after the workpiece 20 is placed in position, the first clamping cylinder 133a drives the first clamping block 131 through the first clamping block seat 133c, and the second clamping cylinder 134a drives the second clamping block 134c through the second clamping block seat 134c. The first clamping block 131 and the second clamping block 132 hold the workpiece 20. The first clamping block 131 and the second clamping block 132 abut against each other to form the sealed chamber 13a. Gas may be charged into the inner chamber of the workpiece through the gas intake nozzle along the gas intake passage 13c.

Figure 15:
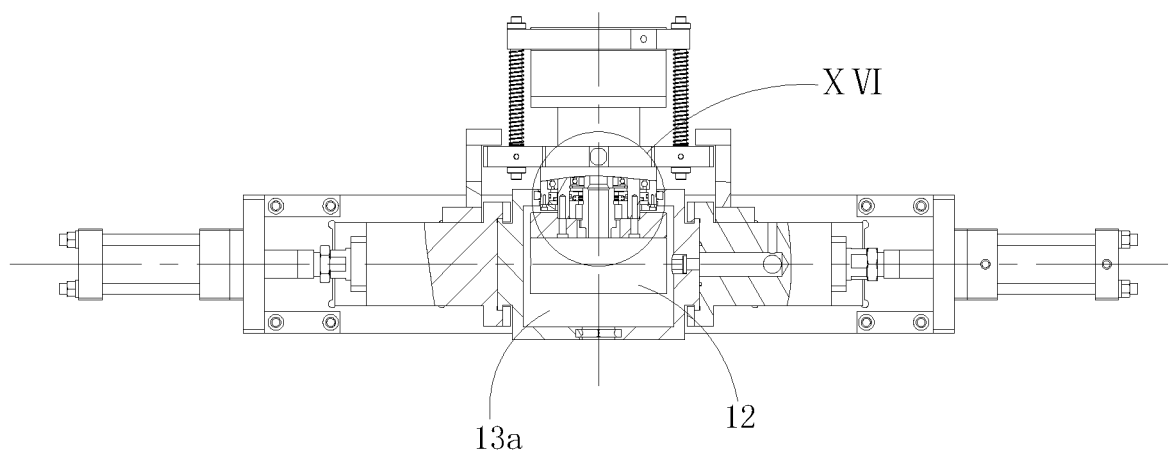
FIG. 15 is a partial cross-sectional view showing the gas-charging and flanging machine with regard to the rotary sealing device according to an embodiment of the present disclosure.
Figure 16:
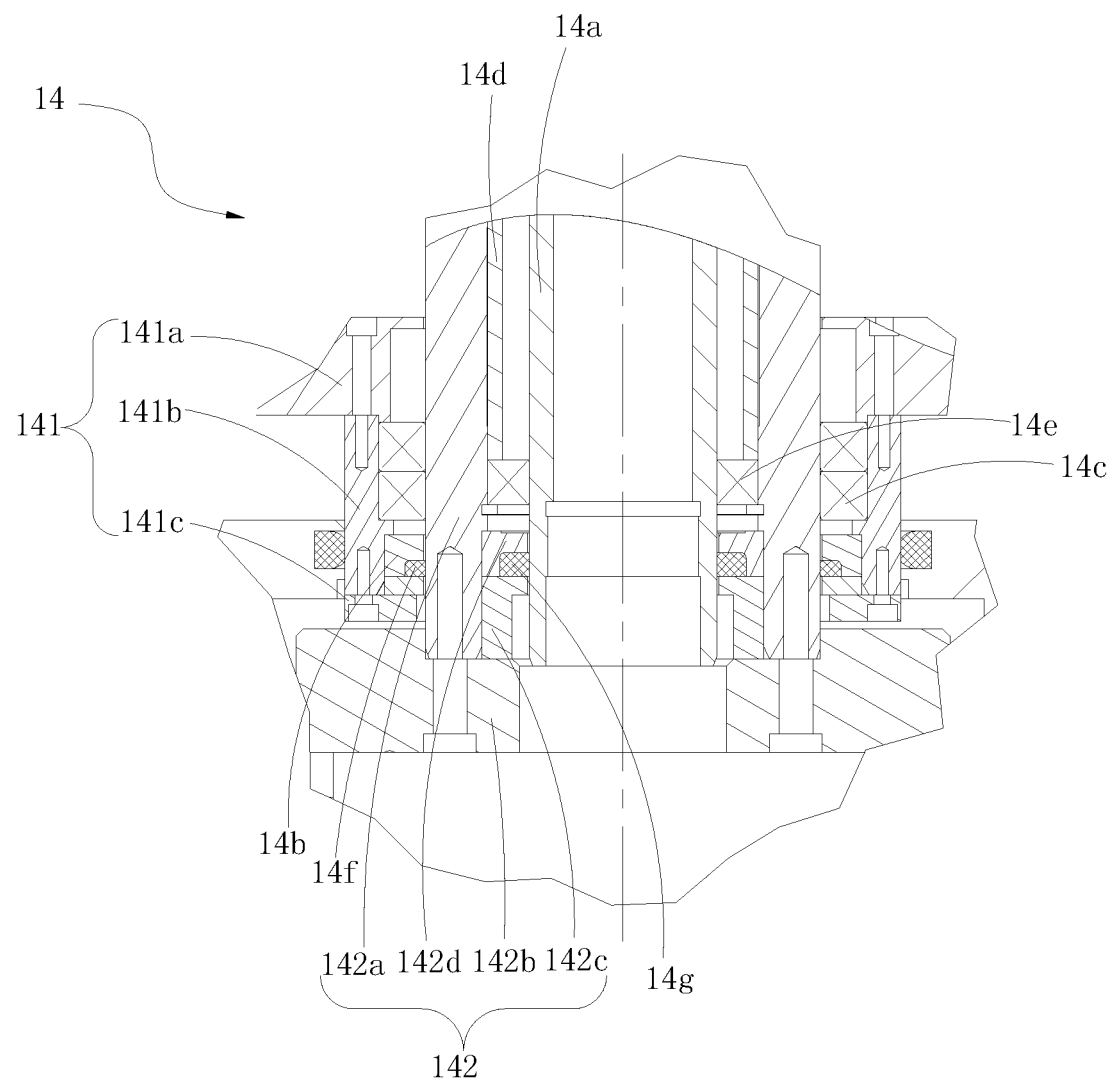
FIG. 16 is an enlarged schematic view of portion XVI of FIG. 15.

Referring to FIGS. 15 and 16, in the present embodiment, the rotary sealing device 14 and the spin-and-press flanging device 12 may be disposed coaxially. The rotary sealing device 14 may include a fixing mechanism 141 and a rotating mechanism 142. The rotating mechanism 142 can rotate relative to the fixing mechanism 141. The rotating mechanism 142 may be coupled to the spin-and-press flanging device 12 to drive the spin-and-press flanging device 12 to rotate.

Specifically, the rotary sealing device 14 may be generally cylindrical in shape. A portion of the rotary sealing device 14 may extend into the sealed chamber 13a of the gas-charging device 13 from the first coupling sleeve 13d. The other portion of the rotary sealing device 14 may be exposed outside. The rotary sealing device 14 may include a gas-charging rotary sleeve 141b, a rear end cover 141a, an outer rotary sealing cover 141c, a spin-and-press main shaft 142a, a transition flange 142b, and a cylinder-pressing connecting rod 14a. The gas-charging rotary sleeve 141b may be substantially cylindrical in shape and has a rear end. The cover 141a and the outer rotary sealing cover 141c may be respectively fixed to the upper and lower ends of the gas-charging rotary sleeve 141b. The spin-and-press flanging device 12 may be located below the outer rotary sealing cover 141c. The transition flange 142b may be interposed between the spin-and-press flanging device 12 and the outer rotary sealing cover 141c. The spin-and-press main shaft 142a may be inserted through the gas-charging rotary sleeve 141b, and the spin-and-press main shaft 142a may be fixedly connected with the transition flange 142b. The transition flange 142b may be fixedly connected with the spin-and-press flanging device 12. The cylinder-pressing connecting rod 14a may be disposed in the gas-charging rotary sleeve 141b. The cylinder pressing connecting rod 14a may be coaxially disposed with the gas-charging rotary sleeve 141b. A following sealing ring seat 14b may be disposed between the gas-charging rotary sleeve 141b and the spin-and-press main shaft 142a. A first rotating and pressing sealing ring 14f may be disposed on the following sealing ring seat 14b. A first rotary bearing 14c may be disposed between the gas-charging rotary sleeve 141b and the spin-and-press main shaft 142a. The first rotary bearing 14c may be located above the following sealing ring seat 14b. A second rotary bearing 14e may be disposed between the spin-and-press main shaft 142a and the cylinder-pressing connecting rod 14a. A spacing sleeve 14d may be disposed between the spin-and-press main shaft 142a and the cylinder-pressing connecting rod 14a. A first inner sealing ring seat 142c and a second inner sealing ring seat 142d may be interposed between the spin-and-press main shaft 142a and the cylinder-pressing connecting rod 14a. The first inner sealing ring seat 142c may be disposed on the transition flange 142b, and the second inner sealing ring seat 142d may be disposed on the first inner sealing ring seat 142c. A second rotating and pressing sealing ring 14g may be interposed between the first inner sealing ring seat 142c, the second inner sealing ring seat 142d and the cylinder pressing connecting rod 14a. The second rotary bearing 14e may be located above the second inner sealing ring seat 142d. The fixing mechanism 141 may include the rear end cover 141a, the gas-charging rotary sleeve 141b, and the outer rotary sealing cover 141c. The rotation mechanism 142 may include the spin-and-press main shaft 142a, the transition flange 142b, the first inner sealing ring seat 142c and the second inner sealing ring seat 142d.

The operating process of the rotary sealing device 14 is: when the gas-charging device 13 is charging a gas into the workpiece 20, the first clamping cylinder 133a and the second clamping cylinder 134a respectively drive the first clamping block 131 and the second clamping block 132 to move and abut each other and clamp on each other. The spin-and-press main shaft 142a drives the spin-and-press flanging device 12 to rotate at a high speed and press down through the transition flange 142b. The rear end cover 141a, the gas-charging rotary sleeve 141b, and the outer rotary sealing cover 141c may be connected together without rotating. The spin-and-press main shaft 142a, the transition flange 142b, the first inner sealing ring seat 142c, and the second inner sealing ring seat 142d rotate together to ensure that the spin-and-press main shaft 142a can rotate through the first rotary bearing 14c and the second rotary bearing 14e.

In the present embodiment, the gas-charging and flanging machine 10 may further include a mounting plate 10a and a resilient member 10b that connects the mounting plate 10a and the rear end cover 141a. The resilient member 10b may be disposed in a direction parallel to the axial direction of the spin-and-press flanging device 12. One end of the resilient member 10b may be fixedly coupled to the mounting plate 10a, and the other end of the resilient member 10b may be coupled to the rear end cover 141a. Preferably, the resilient member 10b may be a spring, and the number of spring may be two. The two springs may be respectively disposed on the left and right sides of the axial direction of the spin-and-press flanging device 12. The rotary sealing device 14 may be fixed on the mounting plate 10a. The spin-and-press flanging device 12 may be fixed on the rotary sealing device 14. The rotary sealing device 14 may be disposed coaxially with the spin-and-press flanging device 12. The rotary sealing device 14, the spin-and-press flanging device 12, and the gas-charging device 13 may be axially symmetrical. The first clamping block seat 133c may be provided with a first axial position-limiting member 10c, and the second clamping block seat 134c may be provided with a second axial position-limiting member 10d. The first axial position-limiting member 10c and the second axial position-limiting member 10d may be used for limiting axial movement of the spin-and-press flange device 12. The first axial position-limiting member 10c and the second axial position-limiting member 10d may be substantially in the shape of the Chinese character "Z". The first axial position-limiting member 10c may include a first fixing portion 10e, a first engaging portion 10f, and a first extending portion 10g connecting the first fixing portion 10e and the first engaging portion 10f. The second axial position-limiting member 10d may include a second fixing portion 10h, a second engaging portion 10i, and a second extending portion 10j connecting the second fixing portion 10h and the second engaging portion 10i. The first axial position-limiting member 10c may be axially symmetrical with respect to the second axial position-limiting member 10d. The first fixing portion 10e may be fixedly connected to the first clamping block seat 133c, and the second fixing portion 10h may be fixedly connected to the second clamping block seat 134c. The first engaging portion 10f and the second engaging portion 10i can be used for engaging the rear end cover 141a, thus achieving axial position limitation of the spin-and-press flanging device 12.

When the gas-charging device 13 is in operation, the first clamping block 131 and the second clamping block 132 form the sealed chamber 13a. Due to an increase in pressure, there is an increase of the force of the spin-and-press flanging device 12 needed to overcome the resilient member 10b. The first axial position-limiting member 10c and the second axial position-limiting member 10d may engage with the rear end cover 141a, thereby limiting the spin-and-press flanging device 12 in the axial direction, and the spin-and-press flanging device 12 cannot move upwards.

Figure 17:
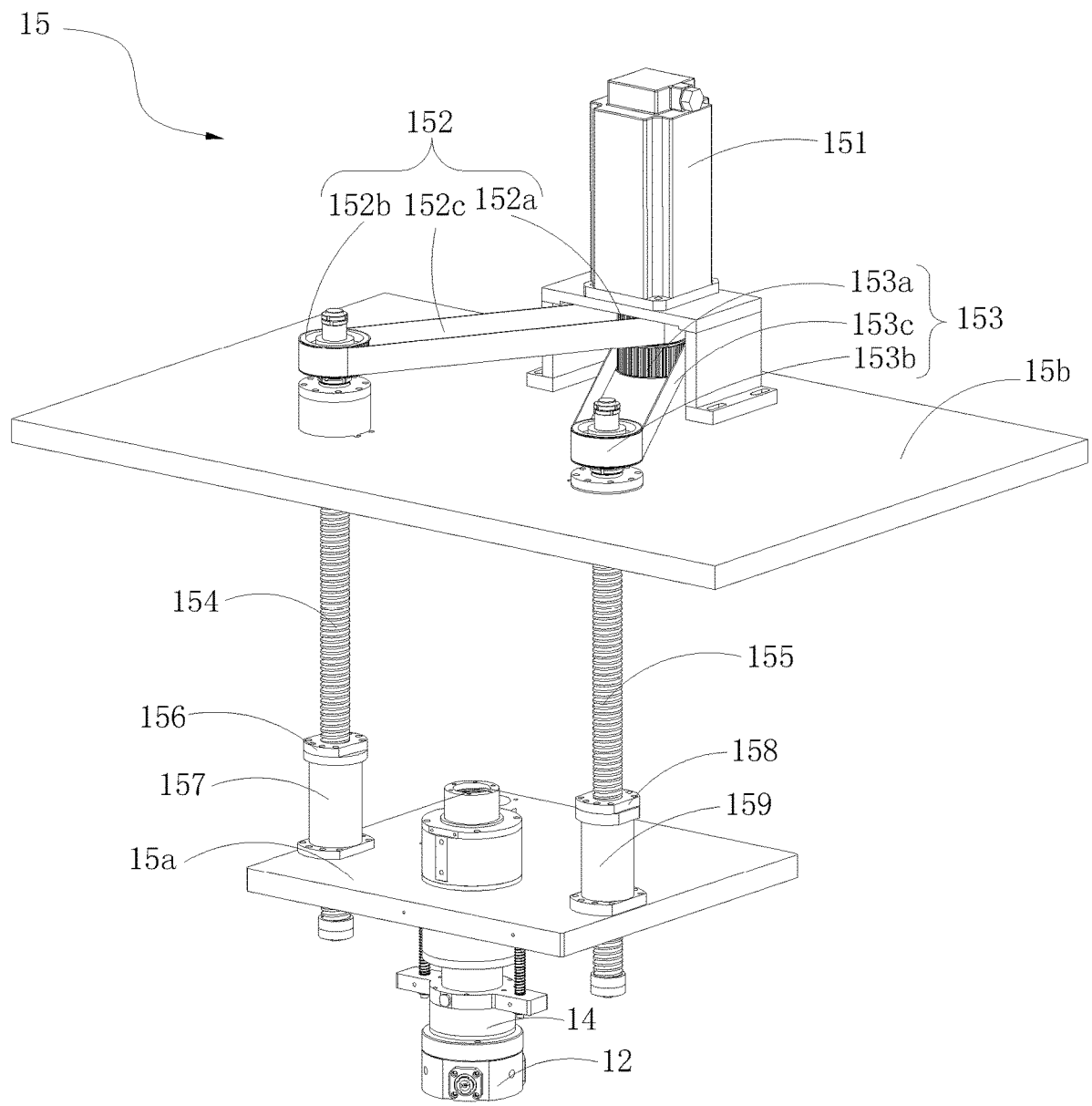
FIG. 17 is a perspective view showing double threaded rods pressure-applying device of the gas-charging and flanging machine according to an embodiment of the present disclosure.
Figure 18:
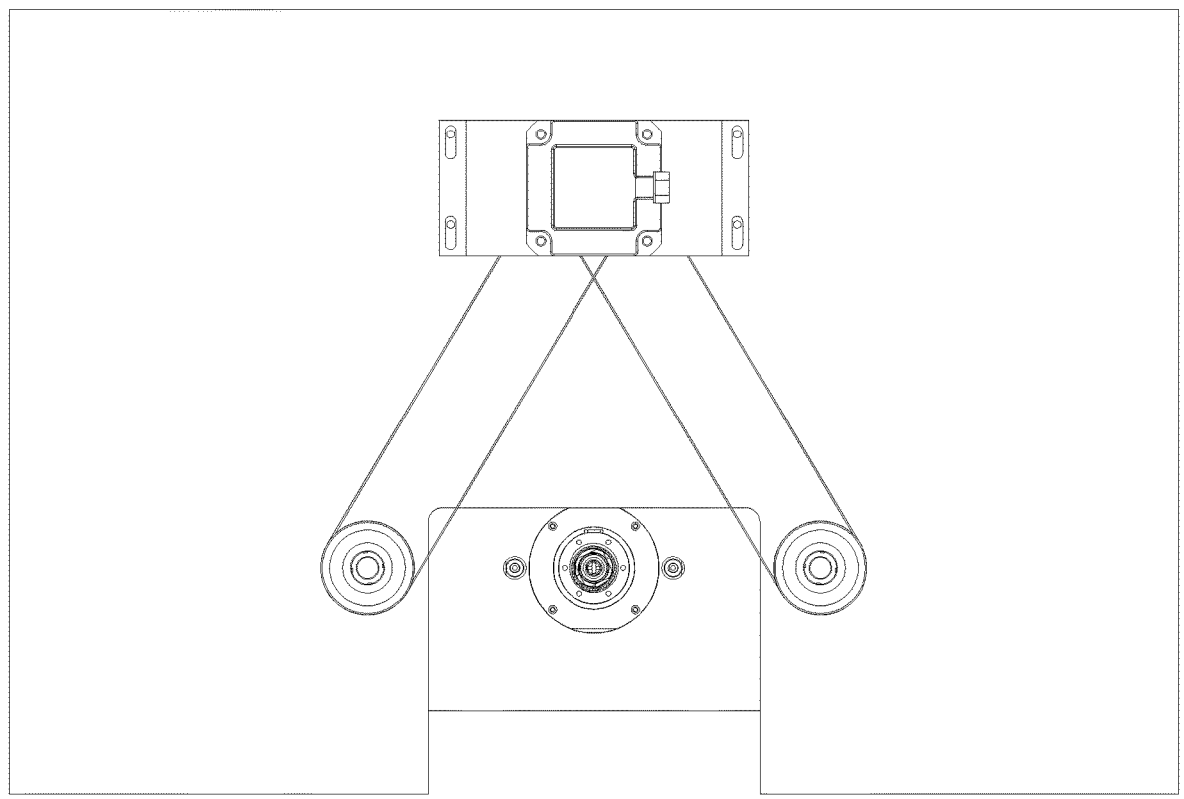
FIG. 18 is a plan view showing the double threaded rods pressure-applying device of the gas-charging and flanging machine according to an embodiment of the present disclosure.
Figure 19:
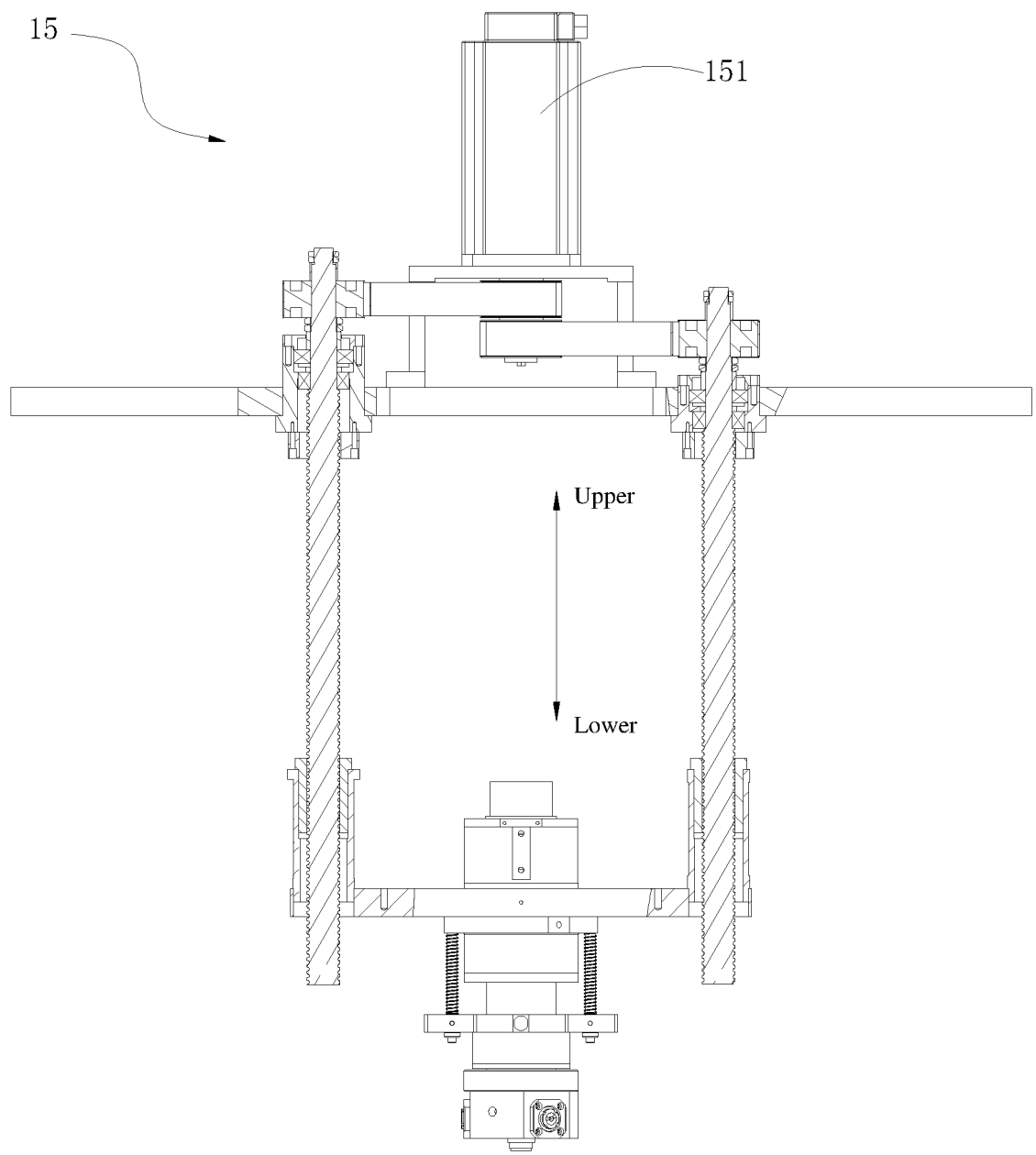
FIG. 19 is a schematic view showing the structure of the double threaded rods pressure-applying device of the gas-charging and flanging machine according to an embodiment of the present disclosure.

Referring to FIG. 17 to FIG. 19, in the present embodiment, the double screw rod pressure feeding device 15 may include a feeding motor 151, a first transmission mechanism 152, a second transmission mechanism 153, a first threaded rod 154, a second threaded rod 155, a first threaded rod nut 156, a first threaded rod nut seat 157, a second threaded rod nut 158, a second threaded rod nut seat 159, a lifting plate 15a, and a fixing plate 15b. The first transmission mechanism 152 may include a first driving pulley 152a, a first driven pulley 152b, and a first belt 152c connecting the first driving pulley 152a and the first driven pulley 152b. The first driven pulley 152b may be connected to the first threaded rod 154. The second transmission mechanism 153 may include a second driving pulley 153a, a second driven pulley 153b, and a second belt 153c connecting the second driving pulley 153a and the second driven pulley 153b. The second driven pulley 153b may be connected with the second threaded rod 155. The feeding motor 151 may be used for driving the first driving pulley 152a and the second driving pulley 153a. The first driving pulley 152a may be located above the second driving pulley 153a. The first driving pulley 152a may be coaxially disposed with the second driving pulley 153a. The first threaded rod 154 and the second threaded rod 155 may be used for driving the lifting plate 15a to move up and down. The first threaded rod nut seat 157 and the second threaded rod nut seat 159 may be fixed on the lifting plate 15a. The first threaded rod 154 may be connected to the first threaded rod nut seat 157 by the first threaded rod nut 156, and the second threaded rod 155 may be connected with the second threaded rod nut seat 159 by the second threaded rod nut 158. The bottom surface of the lifting plate 15a may be mounted with the rotary sealing device 14 and the spin-and-press flanging device 12. The spin-and-press flanging device 12 may be located below the rotary sealing device 14. The first threaded rod 154 and the second threaded rod 155 may be respectively located on the two sides of the axis of the spin-and-press flanging device. The first threaded rod 154 may be parallel to the second threaded rod 155. The first threaded rod nut seat 157 may be disposed adjacent to the left side of the lifting plate 15a, and the second threaded rod nut seat 159 may be disposed adjacent to the right side of the lifting plate 15a. The lifting plate 15a may be disposed parallel with the fixing plate 15b. The feeding motor 151, the first transmission mechanism 152 and the second transmission mechanism 153 may be mounted on the top surface of the fixing plate 15b. The two sides of the first threaded rod 154 and the second threaded rod 155 may pass through the fixing plate 15b and the lifting plate 15a, respectively. Preferably, the first driving pulley 152a and the second driving pulley 153a may be in the form of a unitary structure. In this way, the first threaded rod 154 and the second threaded rod 155 can balance the downward force, thereby making transmission more stable.

The operating process of the double threaded rod pressure feeding device 15 is: the feeding motor 151 rotates to drive the first driving pulley 152a and the second driving pulley 153a. The first driving pulley 152a drives the first driven pulley 152b through the first belt 152c. The first driven pulley 152b drives the first threaded rod 154. The first threaded rod 154 and the first threaded rod nut 156 convert rotary motion into linear motion. The second driving pulley 153a drives the second driven pulley 153b through the second belt 153c. The second driven pulley 153b drives the second threaded rod 155. The second threaded rod 155 and the second threaded rod nut 158 convert rotary motion into linear motion. The left and right sides synchronously move up and down so that the lifting plate 15a can move up and down.

Figure 20:
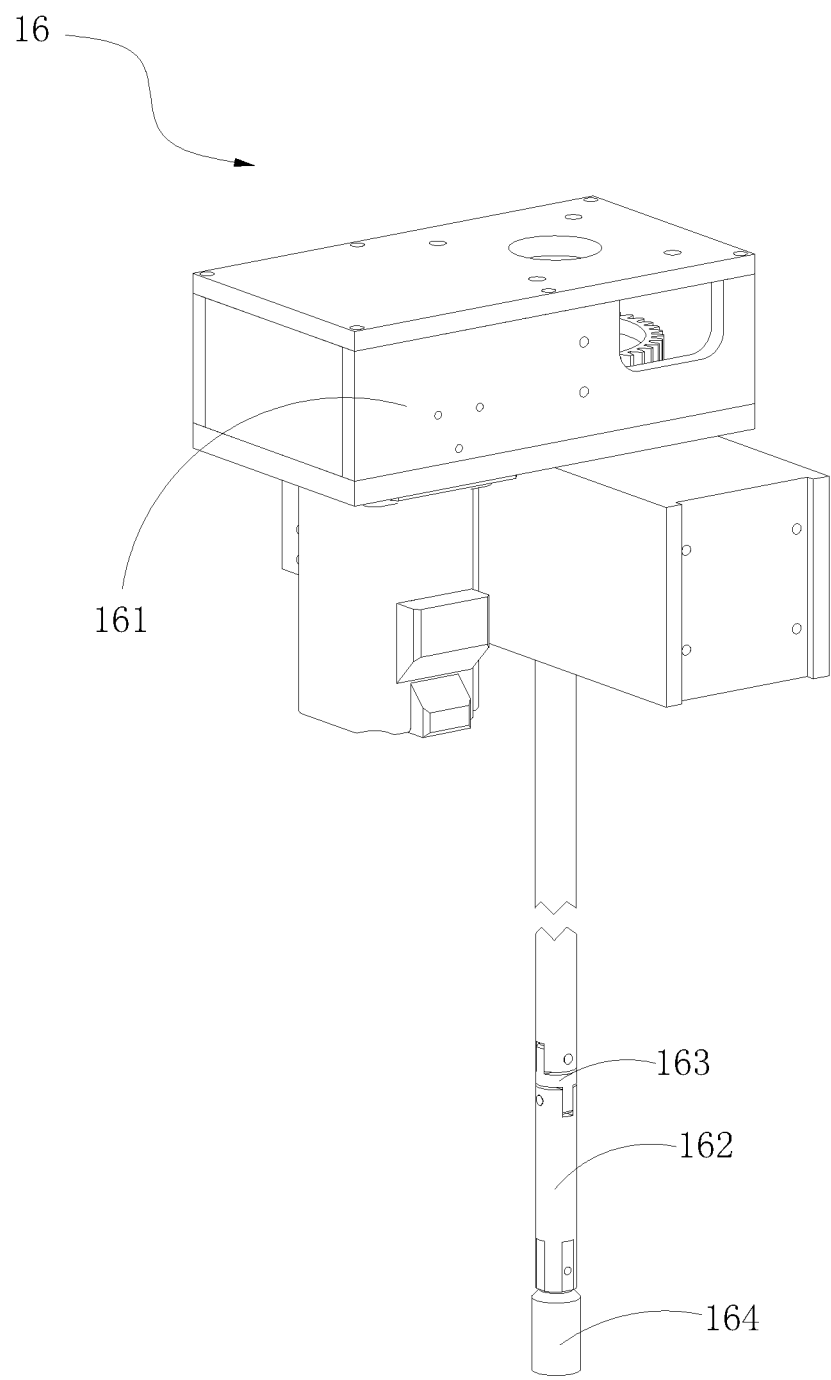
FIG. 20 is a perspective view showing a screw assembly of the gas-charging and flanging machine according to an embodiment of the present disclosure.
Figure 21:
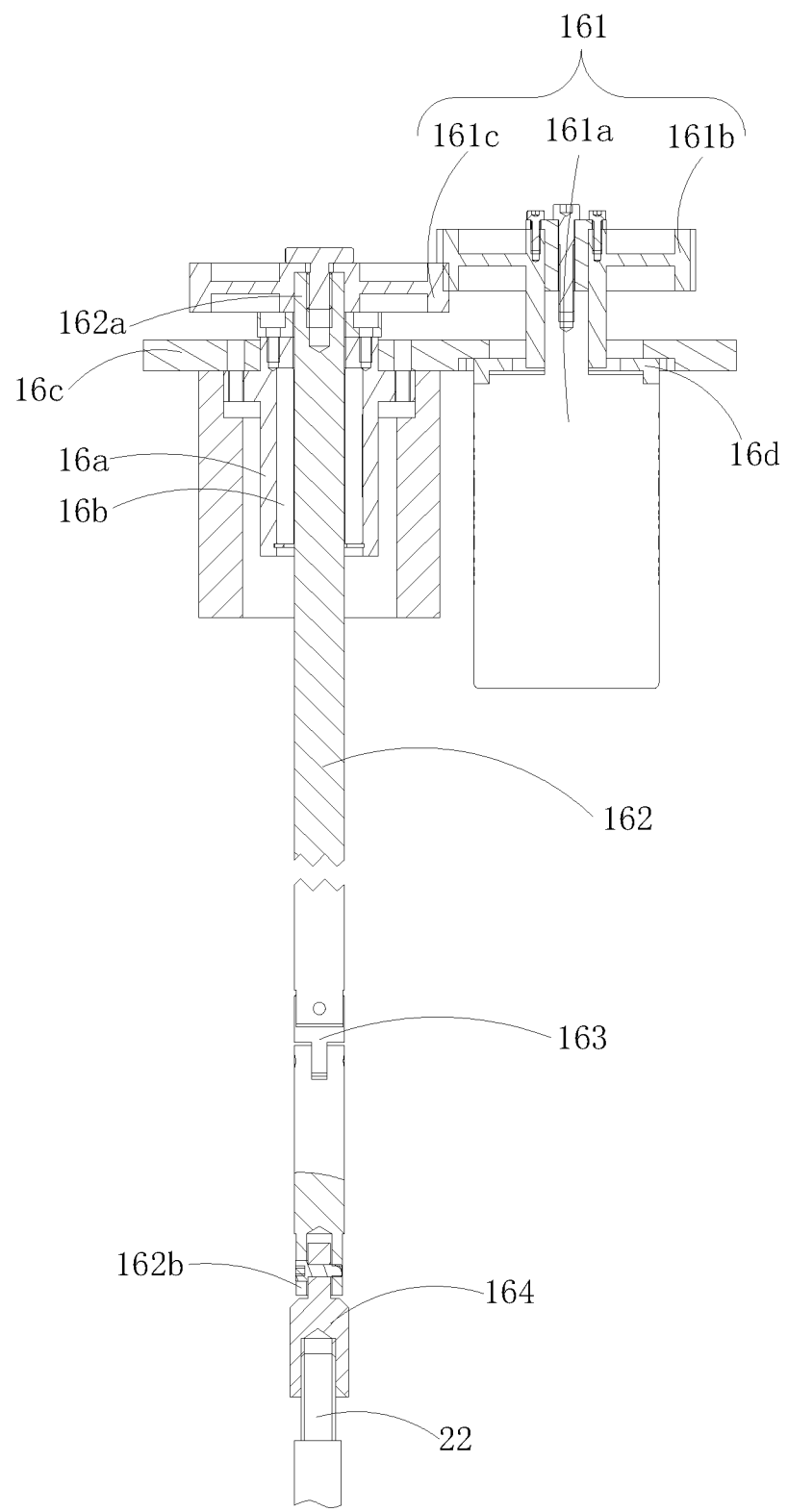
FIG. 21 is a cross-sectional view showing the screw assembly of the gas-charging and flanging machine according to an embodiment of the present disclosure.
Figure 22:
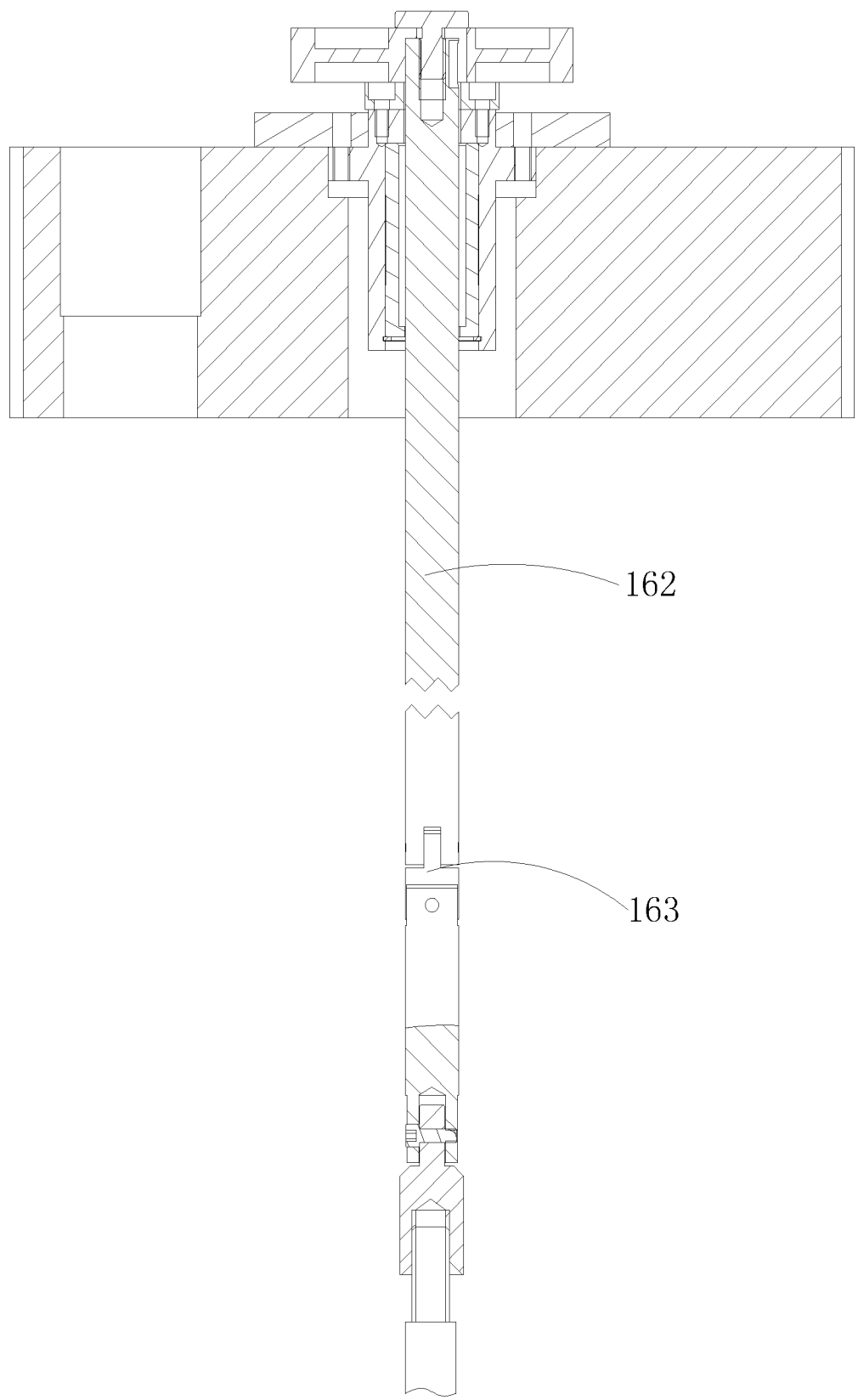
FIG. 22 is another cross-sectional view showing the screw assembly of the gas-charging and flanging machine according to an embodiment of the present disclosure.
Figure 23:
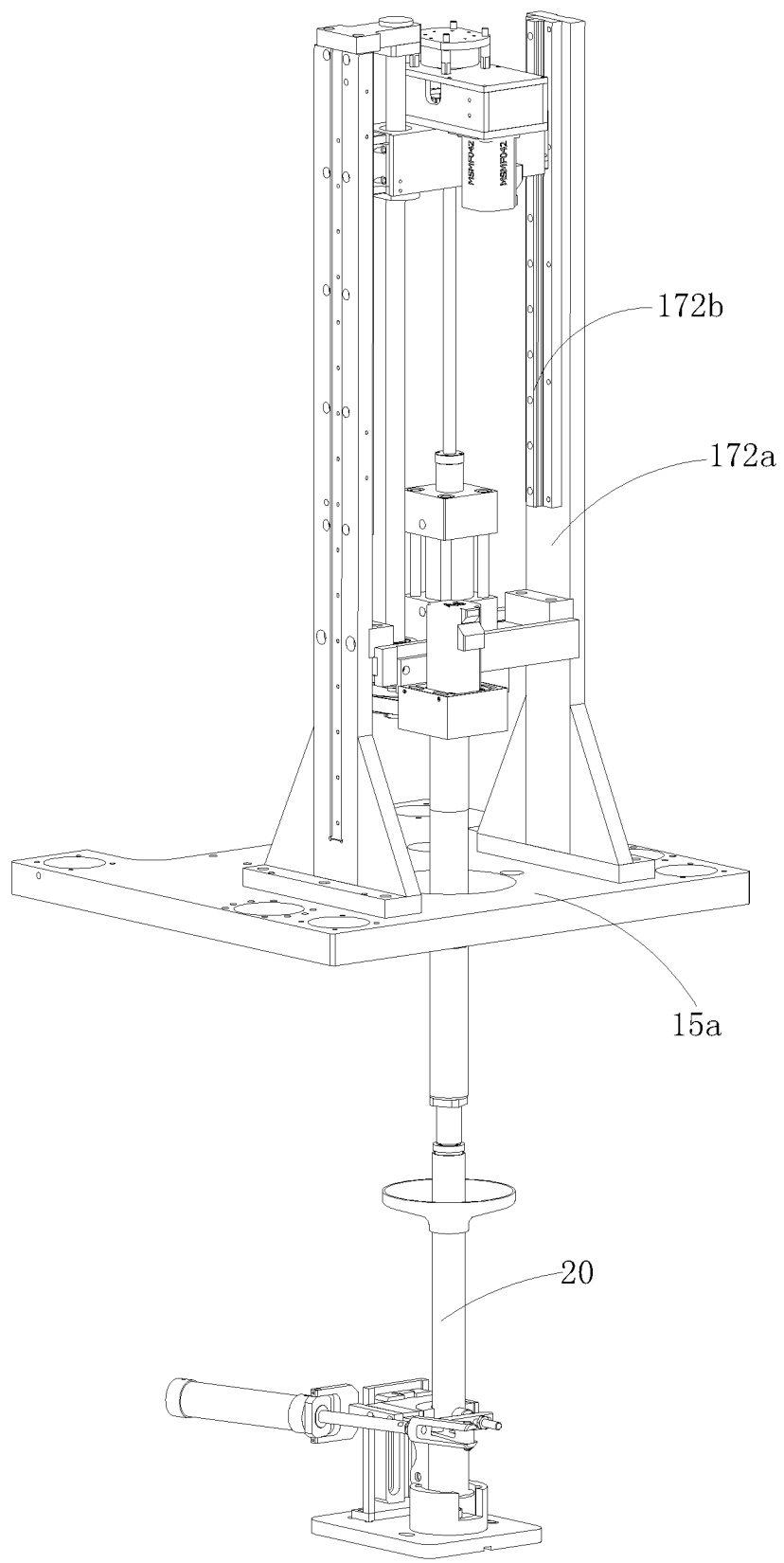
FIG. 23 is a perspective view showing a rod-extracting mechanism of the gas-charging and flanging machine according to an embodiment of the present disclosure.
Figure 24:
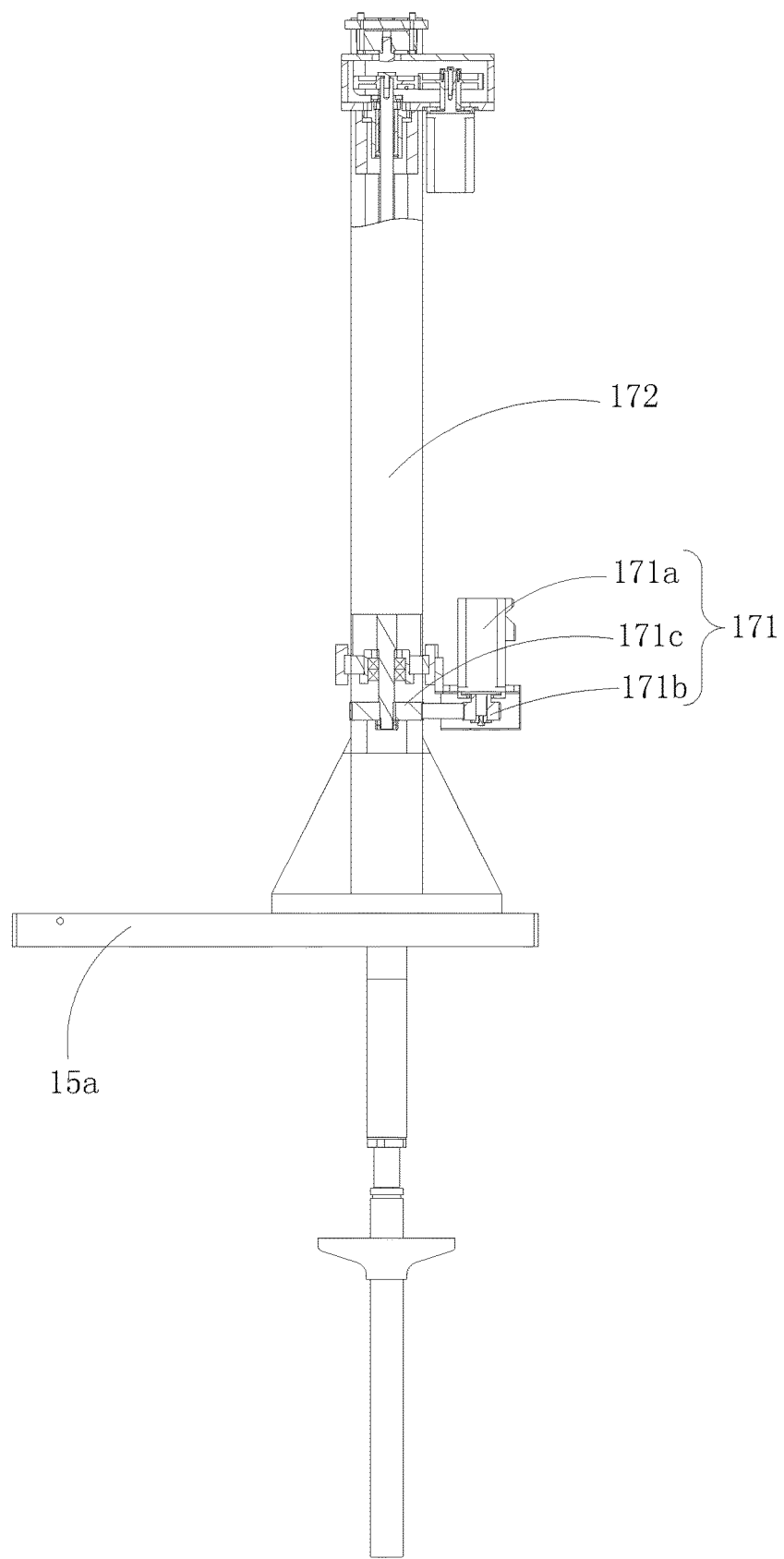
FIG. 24 is a view showing the structure of the rod-extracting mechanism of the gas-charging and flanging machine according to an embodiment of the present disclosure.
Figure 25:
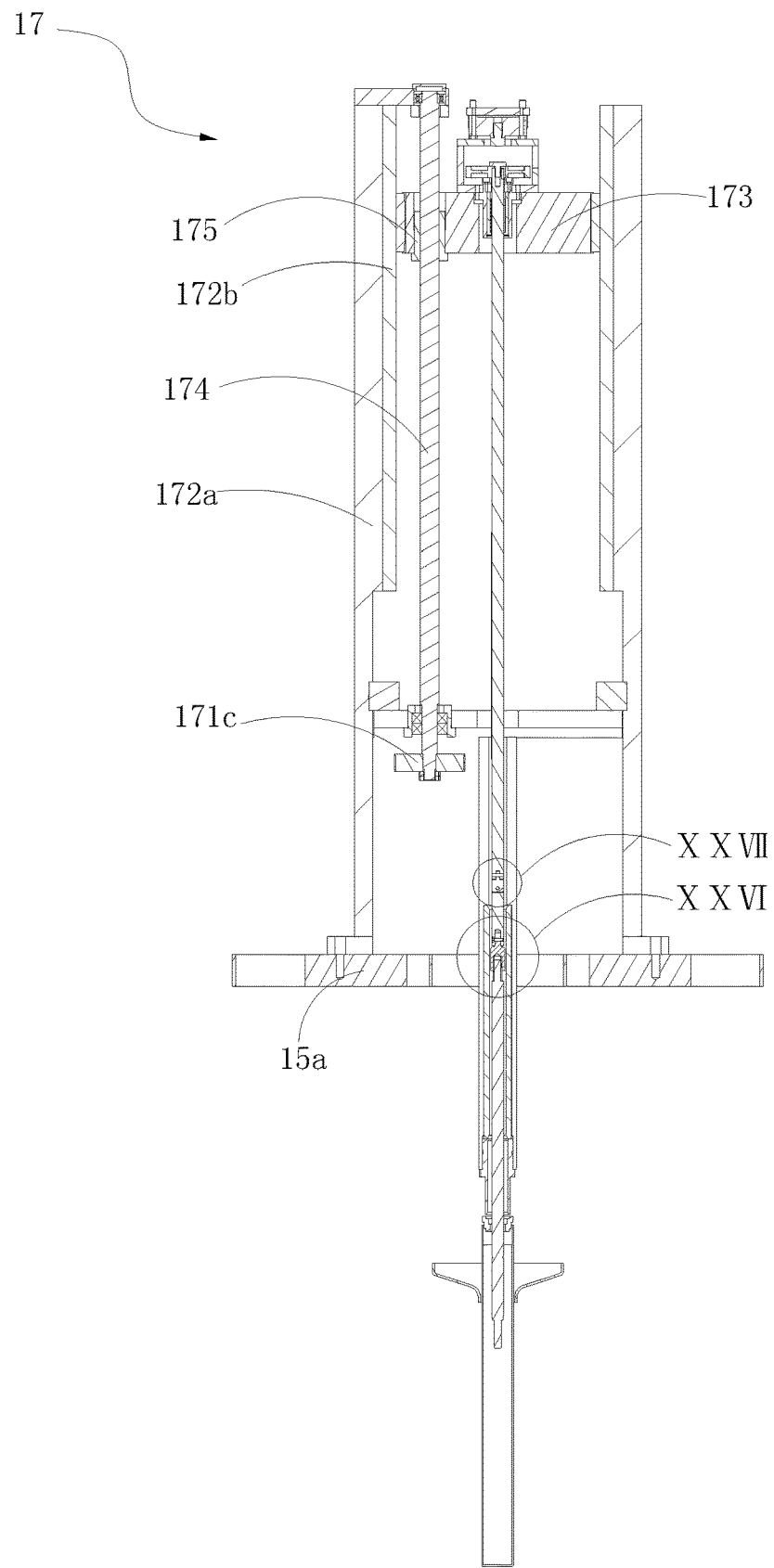
FIG. 25 is a view showing the piston rod-extracting state of the rod-extracting mechanism of the gas-charging and flanging machine according to an embodiment of the present disclosure.
Figure 26:
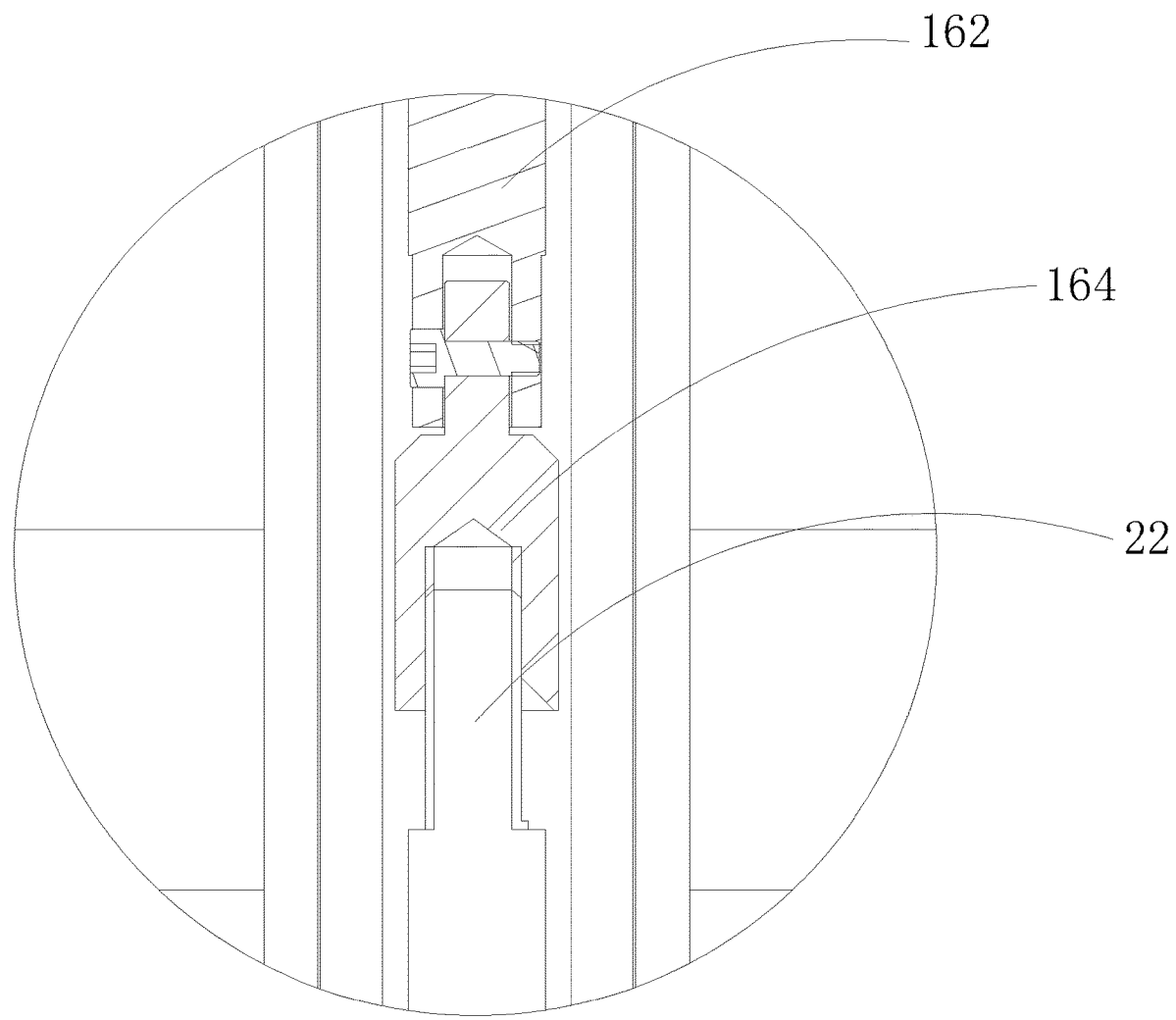
FIG. 26 is an enlarged schematic view of portion XXVI of FIG. 25.
Figure 27:
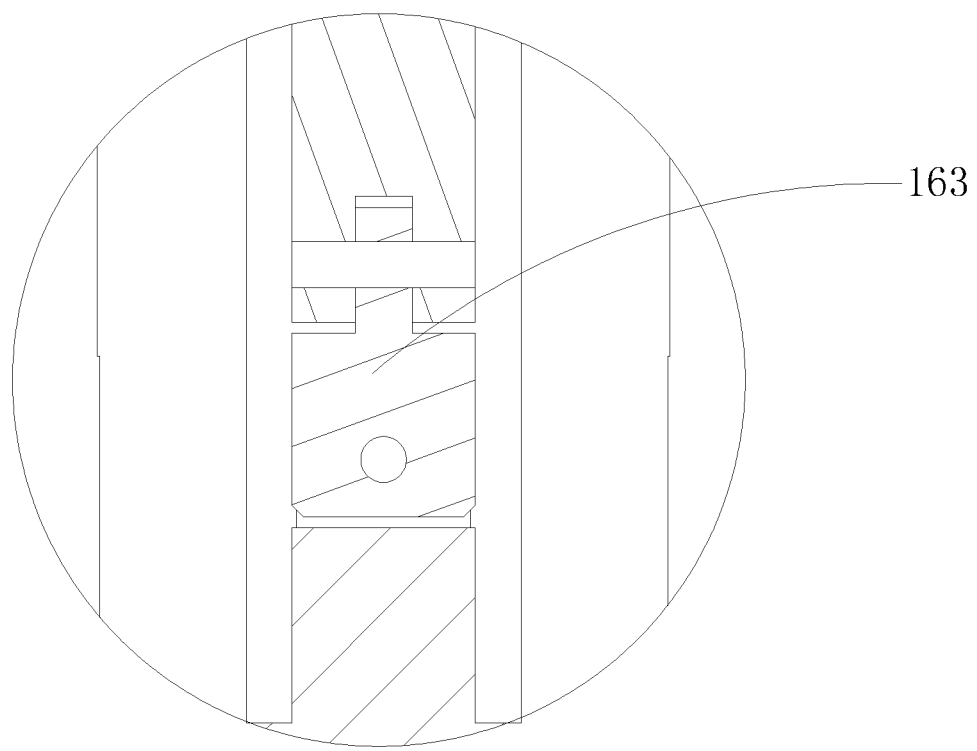
FIG. 27 is an enlarged schematic view of portion XXVII of FIG. 25.

Referring to FIG. 20 to FIG. 22, in the present embodiment, the gas-charging and flanging machine 10 may further include a screw assembly 16. The screw assembly 16 may include a driving mechanism 161, a screw rod 162, a universal joint 163, and a screw head 164. The driving mechanism 161 may be used to drive the screw rod 162 to rotate. The driving mechanism 161 may include a screw rod rotating motor 161a, a screw rod driving gear 161b, and a screw rod driven gear 161c. The screw rod rotating motor 161a may be connected with the screw rod driving gear 161b. The screw rod driving gear 161b may be engaged with the screw rod driven gear 161c. The screw rod 162 may include a first connecting end 162a and a second connecting end 162b opposite to the first connecting end 162a. The first connecting end 162a of the screw rod 162 may be connected with screw rod driven gear 161c. The screw rod 162 may be provided with the universal joint 163. The universal joint 163 may be located between the first connecting end 162a and the second connecting end 162b, and the universal joint 163 may be disposed adjacent to the second connecting end 162b. The second connecting end 162b of the screw rod 162 may be fixedly connected to the screw head 164. A rotating sleeve 16a may be sleeved on the first connecting end 162a of the screw rod 162. A rotating bearing 16b may be disposed between the rotating sleeve 16a and the screw rod 162. The driving mechanism 161 may be mounted on the connecting plate 16c. The screw rod driving gear 161b and the screw rod driven gear 161c may be located on the top surface of the connecting plate 16c. The body of the screw rod rotating motor 161a may be located below the connecting plate 16c. The bottom surface of the connecting plate 16c may be provided with a motor adjusting plate 16d, and the body of the screw rod rotating motor 161a may be fixed on the motor adjusting plate 16d. The driving shaft of the screw rod motor 161a may pass through the connecting plate 16c so as to connect with the screw rod driving gear. The screw rod 162 may pass through the connecting plate 16c so as to connect with the screw rod driven gear 161c. The universal joint 163 and the screw head 164 may be located below the connecting plate 16c, and the screw head 164 may be formed with internal screw threads that connect with the screw threads of the piston rod 22 of the workpiece 20.

The screw rod rotating motor 161a drives the screw rod 162 to rotate through the screw rod driving gear 161b and the screw rod driven gear 161c, and then drives the screw head 164 and the screw threads on the workpiece 20 to screw together through the universal joint 163. In this way, the screw head 164 may achieve flexible connection through the universal joint 163 in both the X and Y directions, thereby ensuring that the screw head 164 can be screwed into the workpiece 20 even when the screw rod 162 may not be concentric with the screw threads of the workpiece 20.

Referring to FIG. 23 to FIG. 27, in the present embodiment, the gas-charging and flanging machine 10 may further include a rod-extracting mechanism 17. The rod-extracting mechanism 17 may include a rod-extracting power device 171, a lifting frame 172, a moving plate 173, a screw threaded rod 174, and a screw threaded rod nut 175. The screw assembly 16 may be mounted on the moving plate 173, and the moving plate 173 may be slidably mounted on the lifting frame 172. The screw threaded rod 174 and the moving plate 173 may be connected by the screw threaded rod nut 175. The rod-extracting power device 171 may be used to drive the screw threaded rod 174 to rotate, thereby realizing up and down movement of the moving plate 173 along the lifting frame 172. The rod-extracting power device 171 may include a screw motor 171a, a screw driving wheel 171b, and a screw driven wheel 171c. The screw motor 171a may be connected to the screw driving wheel 171b, and the screw driving wheel 171b may be connected to the screw driven wheel 171c. The screw driven wheel 171c may be coupled to the screw threaded rod 174. The rod-extracting mechanism 17 may be mounted on the lifting plate 15a. The lifting frame 172 may include two opposite vertical side plates 172a. The two vertical side plates 172a may be fixed on the lifting plate 15a. Each vertical side plate 172a may be provided with a wiring rail 172b. The moving plate 173 may be slidably mounted between the two wiring rails 172b. One end of the screw threaded rod 174 may be fixed to the top end of the lifting frame 172, and the other end of the screw threaded rod 174 may be connected to the screw driven wheel 171c.

When the gas-charging device 13 needs to charge a gas into the workpiece 20, the piston rod 22 of the workpiece 20 needs to be pulled up first so that it is fixed between the guiding mechanism 23 of the piston rod 22 and the oil storage cylinder 21, forming a gap for gas intake. The process of pulling the piston rod 22 by the gas-charging and flanging machine 10 may be as follows: First, the screw motor 171a drives the screw threaded rod 174 to rotate through the screw driving wheel 171b and the screw driven wheel 171c. The rotary motion can be converted to linear motion by the screw threaded rod nut 175, and the moving plate 173 can be moved downwards, thereby moving the screw rod 162 downwards. Then, the screw rod rotating motor 161a drives the screw rod 162 to rotate through the screw rod driving gear 161b and the screw rod driven gear 161c, and drives the screw head 164 and the piston rod 22 of the workpiece 20 to screw together through the universal joint 163. The screw motor 171a may be reversed and drive the moving plate 173 to move upwards, thereby lifting the piston rod 22 on the workpiece 20.

Figure 28:
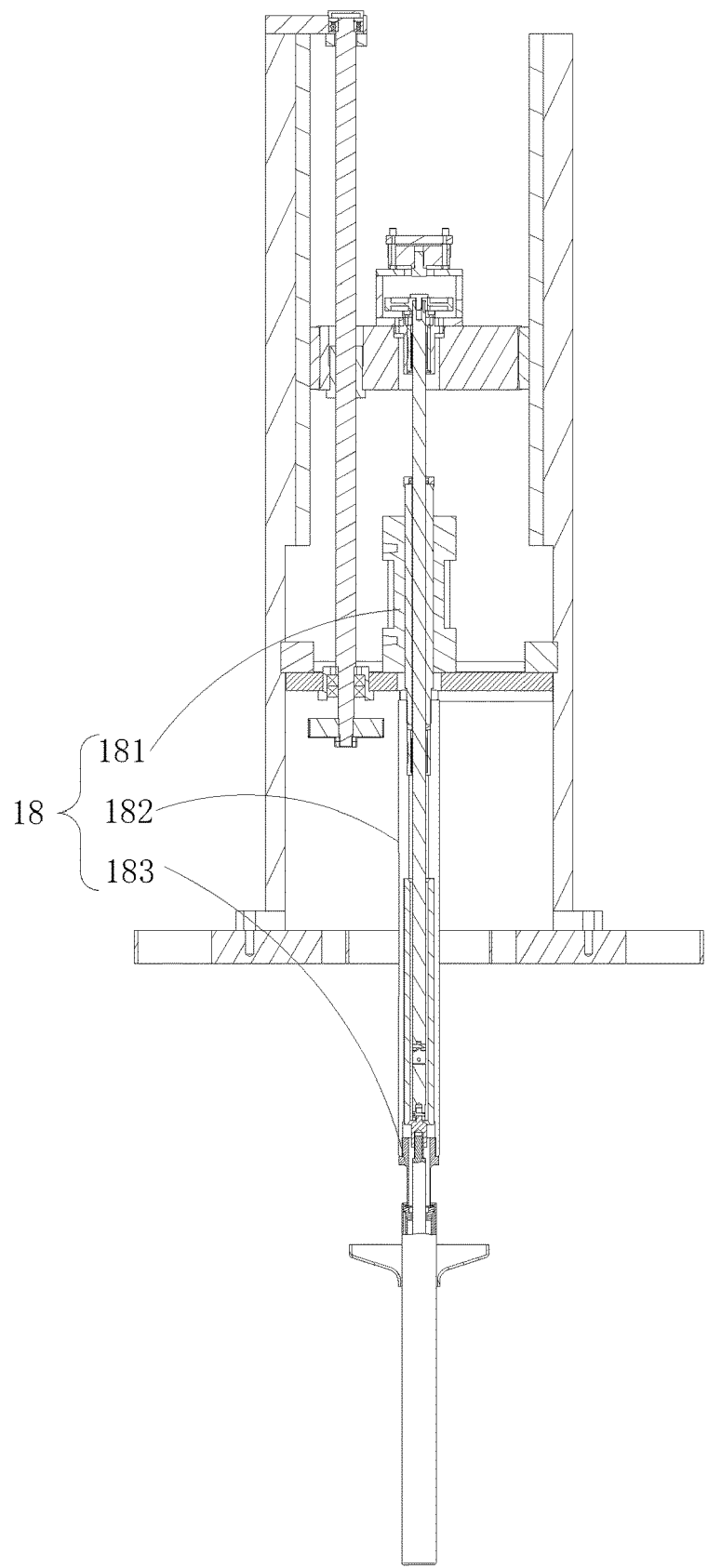
FIG. 28 is a schematic view showing the state of a pressurizing piston rod of the gas-charging and flanging machine according to an embodiment of the present disclosure.

Referring to FIG. 28, in the present embodiment, the gas-charging and flanging machine 10 may further include a rod-pressing power device 18. The rod-pressing power device 18 may include a pressing cylinder 181, a pressing connecting rod 182, and a pressing rod 183. The pressing cylinder 181 may be mounted on the lifting frame 172. After the piston rod 22 is pulled up to charge a gas, the cylinder rod of the pressing cylinder 181 extends and presses downwards. The cylinder rod of the pressing cylinder 181 abuts against the pressing connecting rod 182, and the pressing rod 183 abut against the oil seal 24 of the oil storage cylinder 21 of the workpiece 20. The oil seal 24 abuts against the guiding mechanism 23 of the oil storage cylinder 21, thereby pressing the guiding mechanism 23 into the oil storage cylinder 21.

Figure 29:
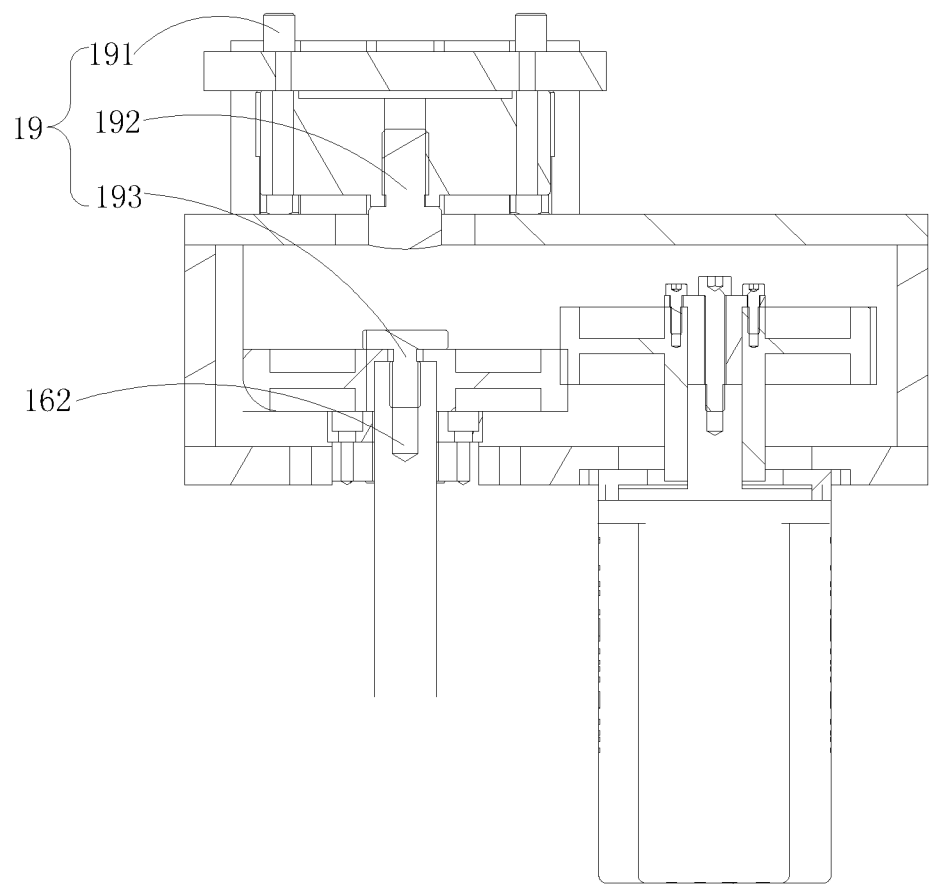
FIG. 29 is a schematic view showing the out of contact state of a reciprocating force measuring mechanism of the gas-charging and flanging machine according to an embodiment of the present disclosure.
Figure 30:
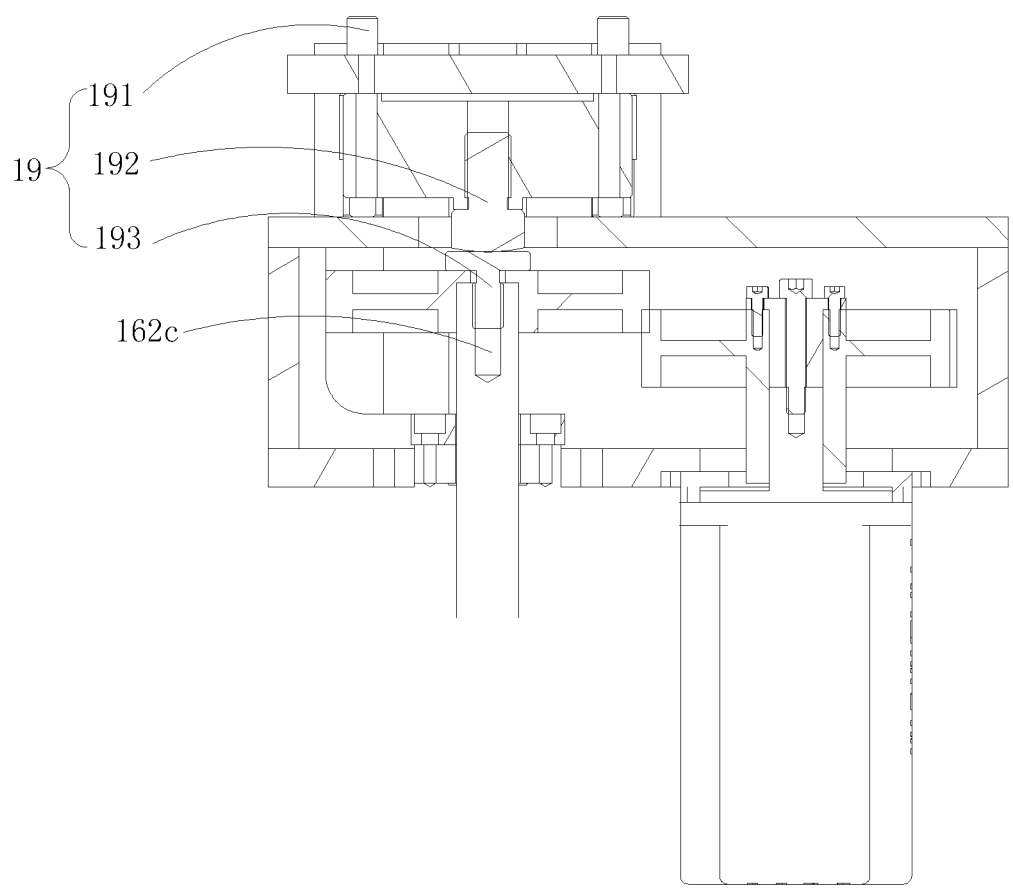
FIG. 30 is a schematic view showing the contact state of the reciprocating force measuring mechanism of the gas-charging and flanging machine according to an embodiment of the present disclosure.

Referring to FIG. 29 and FIG. 30, in the present embodiment, the gas-charging and flanging machine 10 may further include a reciprocating force measuring mechanism 19. The reciprocating force measuring mechanism 19 may include a load sensor 191, a sensor head 192 and a sensor push rod 193. The sensor push rod 193 may be disposed on the screw rod driven gear 161c. The first connecting end 162a of the screw rod 162 may be concavely formed with a conical groove 162c in the axial direction. The sensor push rod 193 can be facing the conical groove 162c. The sensor head 192 may be located directly above the sensor push rod 193. The load sensor 191 may be electrically coupled to the sensor head 192, and the load sensor 191 may be positioned directly above the sensor head 192.

After gas-charging and flanging by the gas-charging and flanging machine 10 is completed, the screw rod 162 may be withdrawn from the screw threads of the workpiece 20. The piston rod 22 moves upwards due to pressure, and the piston rod 22 may press against the screw rod 162 to drive the screw rod driven tooth 161c and the sensor push rod 193 to move upwards, and reach the sensor head 192 such that the load sensor 191 can read the pushing force data of the piston rod 22.

The operating process of the gas-charging and flanging machine 10 of the present disclosure is: first charging a gas, and then flanging the workpiece 20, and finally measuring the pushing force of the piston rod 22. The gas-charging device 13 and the spin-and-press flanging device 12 may be completed at the same working station. Both gas-charging and flanging can be completed in the sealed chamber 13a, such that the oil seal 24 cannot be damaged, thereby ensuring the sealing performance of the produced shock absorber.

In the description of the present specification, the terms "one embodiment", "some embodiments", "illustrative embodiment", "example", "specific example", or "some examples", etc. refer to the combination of characteristic, structure, material or special feature described in the embodiments or examples that may be included in at least one embodiment or example of the disclosure. In the present specification, the schematic representation of the above terms does not necessarily mean the same embodiment or example. Furthermore, the characteristic, structure, material, or special feature described may be combined in a suitable manner in any one or more embodiments or examples.

Although certain embodiments of the disclosure have been shown and described, a person of ordinary skill in the art will understand that various modifications, changes, substitutions and variations of the embodiments may be made without departing from the scope of protection. The scope of protection is defined by the claims and their equivalents.

What is claimed is:

1. A gas-charging and flanging machine, comprising a sealed chamber, the gas-charging and flanging machine being used for carrying out, inside the sealed chamber, charging of a gas into a workpiece and flanging of the workpiece by spinning and pressing.

2. The gas-charging and flanging machine according to claim 1, further comprising:
   a gas-charging device; and
   a spin-and-press flanging device, wherein the gas-charging device is used for charging the gas into the workpiece, and the spin-and-press flanging device is used for flanging the workpiece charged with the gas, the gas-charging device comprising:
   a first clamping block;
   a second clamping block;
   a first clamping mechanism;
   a second clamping mechanism; and
   a gas intake nozzle, wherein the first clamping mechanism is used for driving the first clamping block to move, and the second clamping mechanism is used for driving the second clamping block to move, the first clamping block and the second clamping block are used for enclosing and forming the sealed chamber, the sealed chamber is in communication with the gas intake nozzle, the spin-and-press flanging device is a horizontal spin-and-press flanging device or a vertical spin-and-press flanging device, and the sealing chamber is used for housing the horizontal spin-and-press flanging device or the vertical spin-and-press flanging device.

3. The gas-charging and flanging machine according to claim 2, wherein the first clamping mechanism comprises a first clamping cylinder; a first cylinder seat; and a first clamping block seat, wherein the first clamping cylinder being mounted on the first cylinder seat, and the first clamping cylinder and the first clamping block being connected respectively to a left and right end of the first clamping block seat; and wherein the second clamping mechanism comprises a second clamping cylinder; a second cylinder seat; and a second clamping block seat, the second clamping cylinder being mounted on the second cylinder seat, and the second clamping cylinder and the second clamping block being connected respectively to a left and right end of the second clamping block seat.

4. The gas-charging and flanging machine according to claim 3, wherein the second clamping block seat is provided with the gas intake nozzle, the second clamping block seat and the second clamping block together form a gas intake passage, and the gas intake passage is in communication with the gas intake nozzle and the sealing chamber.

5. The gas-charging and flanging machine according to claim 4, wherein the spin-and-press flanging device comprises:
   a sealing wheel mounting disk;
   a guiding mechanism; and
   a spin-and-press mechanism, wherein the guiding mechanism and the spin-and-press mechanism are mounted on the sealing wheel mounting disk, the guiding mechanism is used for straightening the workpiece so that the workpiece is disposed coaxially with the spin-and-press flanging device, and the spin-and-press mechanism is used for spinning and pressing the workpiece so as to achieve flanging of the workpiece.

6. The gas-charging and flanging machine according to claim 2, further comprising a fixing device for fixing the workpiece, the fixing device comprising:
   a base;
   a mounting bracket;
   a positioning block;
   a swinging rod;
   a pressing rod;
   a cylinder; and
   a connecting rod, wherein the base comprises a bottom plate and a fixing position disposed on the bottom plate, the fixing position is used for mounting the workpiece, the mounting bracket is fixed on the bottom plate, the positioning block is fixed on the mounting bracket, the cylinder is fixed on the mounting bracket, and the cylinder is used for driving the connecting rod, the swinging rod is rotatably mounted on the mounting bracket, the swinging rod comprises a first swinging rod and a second swinging rod connected to the first swinging rod, the first swinging rod is connected to the connecting rod, the second swinging rod is connected to the pressing rod, and the pressing rod is used for pressing the workpiece against the positioning block.

7. The gas-charging and flanging machine according to claim 6, wherein the second swinging rod is formed with a mounting groove, the pressing rod comprises an abutting portion and a cylindrical portion connected to the abutting portion, the cylindrical portion is disposed in the mounting groove, a fixing nut is mounted on the cylindrical portion, the second swinging rod is located between the abutting portion and the fixing nut, and the abutting portion is used for abutting against the workpiece.

8. The gas-charging and flanging machine according to claim 2, further comprising a driving mechanism and a screw rod, wherein the driving mechanism is used for driving the screw rod to rotate, and the screw rod is used for connecting a piston rod of the workpiece.

9. The gas-charging and flanging machine according to claim 8, further comprising a load sensor; a sensor head; and a sensor push rod, the driving mechanism comprising a screw rod rotating motor; a screw rod rotating driving gear; and a screw rod rotating driven gear, wherein the motor is connected to the driving gear, the driving teeth meshes with the driven gear, the sensor push rod is disposed on the driven gear, the sensor push rod is facing screw rod, the sensor head is located directly above the sensor push rod, and the load sensor is electrically coupled to the sensor head.

10. The gas-charging and flanging machine according to claim 9, further comprising a rod-extracting mechanism, the rod-extracting mechanism comprising a rod-extracting power device; a lifting frame; a moving plate; a screw threaded rod; and a screw threaded rod nut, wherein the screw rod is mounted on the moving plate, the moving plate is slidably mounted on the lifting frame, the screw rod and the moving plate are connected by the screw threaded rod nut, and the rod-extracting power device is used for driving the screw rod to rotate such that the moving plate moves up and down along the lifting frame.

* * * * *